(12) United States Patent
Tamura et al.

(10) Patent No.: US 11,337,124 B2
(45) Date of Patent: May 17, 2022

(54) FIRST BASE STATION, SECOND BASE STATION, TERMINAL APPARATUS, METHOD, PROGRAM, AND RECORDING MEDIUM

(71) Applicant: NEC CORPORATION, Tokyo (JP)

(72) Inventors: Tomu Tamura, Tokyo (JP); Yoshikazu Kakura, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 212 days.

(21) Appl. No.: 16/604,110

(22) PCT Filed: Mar. 15, 2018

(86) PCT No.: PCT/JP2018/010254
§ 371 (c)(1),
(2) Date: Oct. 9, 2019

(87) PCT Pub. No.: WO2018/190070
PCT Pub. Date: Oct. 18, 2018

(65) Prior Publication Data
US 2021/0289405 A1  Sep. 16, 2021

(30) Foreign Application Priority Data

Apr. 12, 2017 (JP) .............................. JP2017-078695

(51) Int. Cl.
*H04W 36/00* (2009.01)
*H04W 36/08* (2009.01)

(52) U.S. Cl.
CPC ....... *H04W 36/0083* (2013.01); *H04W 36/08* (2013.01)

(58) Field of Classification Search
CPC .......................... H04W 36/0083; H04W 36/08
USPC .................................................. 455/436–448
See application file for complete search history.

(56) References Cited

U.S. PATENT DOCUMENTS

| 2011/0117916 | A1 | 5/2011 | Dahlén |
| 2013/0012212 | A1 | 1/2013 | Murakami et al. |
| 2013/0094486 | A1* | 4/2013 | Bhanage ............. H04W 72/121 370/338 |
| 2017/0079059 | A1* | 3/2017 | Li .......................... H04W 16/02 |

FOREIGN PATENT DOCUMENTS

| JP | 2011-510595 A | 3/2011 |
| WO | 2011/148883 A1 | 12/2011 |

OTHER PUBLICATIONS

Huawei, "Slice Awareness of Availability during Mobility", 3GPP TSG-RAN WG3 95bis, R3-171250, Apr. 3-7, 2017, pp. 1-4.

(Continued)

*Primary Examiner* — Joel Ajayi
(74) *Attorney, Agent, or Firm* — Sughrue Mion, PLLC

(57) ABSTRACT

In order to make a slice that is being used by or available for a terminal apparatus, available even at a handover destination or a cell reselection destination, a first base station 100 includes: an obtaining section 141 configured to obtain information related to usage status of a slice provided by the first base station 100; and a transmission processing section 143 configured to transmit the information related to the usage status of the slice.

5 Claims, 25 Drawing Sheets

(56) References Cited

OTHER PUBLICATIONS

Intel Corporation, "Consideration on Slicing visibility to UE AS layer", 3GPP TSG RAN WG2 #97bis, R2-1703442, Apr. 3-7, 2017, pp. 1-3.
Samsung, "Discussion on HeNB NRT Management in Macro eNB", 3GPP TSG RAN WG3 #63 bis, R3-090857, Mar. 23-26, 2009, pp. 1-2.
"3rd Generation Partnership Project; Technical Specification Group Services and System Aspects; Study on Architecture for Next Generation System (Release 14)", 3GPP TR 23.799 Dec. 2016, pp. 1-261.
"3rd Generation Partnership Project; Technical Specification Group Radio Access Network; EvolvedUniversal Terrestrial Radio Access (E-UTRA) and Evolved Universal Terrestrial Radio Access Network (E-UTRAN); Overall description; Stage 2 (Release 14)", 3GPP TS 36.300 Dec. 2016, pp. 1-317.
"3rd Generation Partnership Project; Technical Specification Group Radio Access Network; Study on Scenarios and Requirements for Next Generation Access Technologies; (Release 14)", 3GPP TR 38.913, Oct. 2016, pp. 1-39.
"3rd Generation Partnership Project; Technical Specification Group Radio Access Network; Evolved Universal Terrestrial Radio Access Network (E-UTRAN); X2 application protocol (X2AP) (Release 14)", 3GPP TS 36.423, Jan. 2017, pp. 1-240.
"3rd Generation Partnership Project; Technical Specification Group Radio Access Network; Study on New Radio Access Technology; Radio Access Architecture and Interfaces (Release 14)", 3GPP TR 38.801, Mar. 2017, pp. 1-90.
International Search Report for PCT/JP2018/010254 dated May 22, 2018 [PCT/ISA/210].
Communication dated Dec. 13, 2019, from the European Patent Office in application No. 18784817.1.
Written Opinion of the International Searching Authority dated May 22, 2018, in International Application No. PCT/JP2018/010254.
"RAN Support of Slice Availability", Huawei, 3GPP TSG-RAN WG3 AH, R3-170223, Jan. 17-19, 2017, (2 pages total).
"Mobility procedure considering network slice", LG Electronics Inc., 3GPP TSG-RAN WG3 Meeting #95bis, R3-171129, Apr. 3-7, 2017, (4 pages total).
"NW Slice Availability Handling Approaches during Mobility", ZTE, 3GPP TSG RAN WG3 Meeting #95bis, R3-171029, Apr. 3-7, 2017, (6 pages total).
"Slice Availability and Discovery in RAN", Huawei, HiSilicon, 3GPP TSG-RAN WG2#97, R2-1701218,Feb. 13-17, 2017 (5 pages total).
"Slice Availability and impact on Mobility", Nokia, Alcatel-Lucent Shanghai Bell, 3GPP TSG-RAN WG3 Meeting #94, R3-162944, Nov. 14-18, 2016, (4 pages total).
Japanese Office Action for JP Application No. 2019-512394 dated Jan. 5, 2021 with English Translation.

\* cited by examiner

NRT OF CELL 5-1(BEFORE UPDATE)

| NEIGHBOUR CELL | Status of Slice |
|---|---|
| CELL1-1 | Sid1(normal), Sid2(normal), Sid3(normal) |
| CELL2-1 | Sid1(normal), Sid2(normal), Sid3(normal) |
| CELL3-1 | Sid1(normal), Sid2(normal), Sid3(normal) |
| CELL4-1 | Sid1(normal), Sid2(normal), Sid3(normal) |

NRT OF CELL 5-1(AFTER UPDATE)

| NEIGHBOUR CELL | Status of Slice |
|---|---|
| CELL1-1 | Sid1(normal), Sid2(normal), Sid3(normal) |
| CELL2-1 | Sid1(normal), Sid2(normal), Sid3(normal) |
| CELL3-1 | Sid1(limited), Sid2(normal), Sid3(limited) |
| CELL4-1 | Sid1(limited), Sid2(limited), Sid3(normal) |

Fig. 10

9.1.2.11 RESOURCE STATUS REQUEST
This message is sent by an eNB$_1$ to neighbouring eNB$_2$ to initiate the requested measurement according to the parameters given in the message.
Direction: eNB$_1$ → eNB$_2$.

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1..4095,...) | Allocated by eNB$_1$ | YES | reject |
| eNB2 Measurement ID | C-ifRegistrationRequestStopor PartialStoporAdd | | INTEGER (1..4095,...) | Allocated by eNB$_2$ | YES | ignore |
| Registration Request | M | | ENUMERATED(start, stop, ..., partial stop, add) | Type of request for which the resource status is required. | YES | reject |
| Report Characteristics | O | | BITSTRING (SIZE(32)) | Each position in the bitmap indicates measurement object the eNB$_2$ is requested to report. First Bit = PRB Periodic, Second Bit = TNL load Ind Periodic, Third Bit = HW Load Ind Periodic, Fourth Bit = Composite Available Capacity Periodic, this bit should be set to 1 if at least one of the First, Second or Third bits is set to 1, Fifth Bit = ABS Status Periodic, Sixth Bit = RSRP Measurement Report Periodic, Seventh Bit = CSI Report Periodic, Eighth Bit = Slice Instance Status Report Periodic. Other bits shall be ignored by the eNB$_2$. | YES | reject |
| Cell To Report | | 1 | | Cell ID list to which the request applies. | YES | ignore |
| >Cell To Report Item | | 1 .. <maxCellineNB> | | | EACH | ignore |
| >>Cell ID | M | | ECGI 9.2.14 | | – | – |
| Reporting Periodicity | O | | ENUMERATED(1000ms, 2000ms, 5000ms,10000ms, ...) | Periodicity that can be used for reporting of PRB Periodic, TNL Load Ind Periodic, HW Load Ind Periodic, Composite Available Capacity Periodic or ABS Status Periodic. | YES | ignore |
| Partial Success Indicator | O | | ENUMERATED(partial success allowed, ...) | Included if partial success is allowed | YES | ignore |
| Reporting Periodicity of RSRP Measurement Report | O | | ENUMERATED(120ms, 240ms, 480ms, 640ms, ...) | Periodicity that can be used for the reporting of RSRP Measurement Report Periodic. | YES | ignore |
| Reporting Periodicity of CSI Report | O | | ENUMERATED(5ms, 10ms, 20ms, 40ms, 80ms, ...) | Periodicity that can be used for the reporting of CSI Report Periodic. | YES | ignore |

Fig. 15A

| Range bound | Explanation |
| --- | --- |
| maxCellineNB | Maximum no. cells that can be served by an eNB. Value is 256. |

| Condition | Explanation |
| --- | --- |
| ifRegistrationRequestStoporPartialStoporAdd | This IE shall be present if the Registration Request IE is set to the value "stop", "partial stop" or "add". |

Fig. 15B 9.1.2.12 RESOURCE STATUS RESPONSE
This message is sent by the eNB$_2$ to indicate that the requested measurement, for all or for a subset of the measurement objects included in the measurement is successfully initiated.
Direction: eNB$_2$ → eNB$_1$.

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1..4095,...) | Allocated by eNB$_1$ | YES | reject |
| eNB2 Measurement ID | M | | INTEGER (1..4095,...) | Allocated by eNB$_2$ | YES | reject |
| Criticality Diagnostics | O | | 9.2.7 | | YES | ignore |
| Measurement Initiation Result | | | | List of all cells in which measurement objects were requested, included when indicating partial success | YES | ignore |
| >Measurement Initiation Result Item | | 1 ..<maxCellineNB> | | | EACH | ignore |
| >>Cell ID | M | | ECGI 9.2.14 | | — | — |
| >>Measurement Failure Cause List | | 0..1 | | Indicates that eNB$_2$ could not initiate the measurement for at least one of the requested measurement objects in the cell | — | — |
| >>>Measurement Failure Cause Item | | 1 ..<maxFailedMeasObjects> | | | EACH | ignore |
| >>>>Measurement Failed Report Characteristics | M | | BITSTRING (SIZE(32)) | Each position in the bitmap indicates measurement object that failed to be initiated in the eNB$_2$. First Bit = PRB Periodic, Second Bit = TNL load Ind Periodic, Third Bit = HW Load Ind Periodic, Fourth Bit = Composite Available Capacity Periodic, Fifth Bit = ABS Status Periodic, Sixth Bit = RSRP Measurement Report Periodic, Seventh Bit = CSI Report Periodic, Eighth Bit = Slice Instance Status Report Periodic. Other bits shall be ignored by the eNB$_1$. | — | — |
| >>>>Cause | M | | 9.2.6 | Failure cause for measurement objects for which the measurement cannot be initiated | — | — |

Fig. 16A

| Range bound | Explanation |
|---|---|
| maxFailedMeasObjects | Maximum number of measurement objects that can fail per measurement. Value is 32. |
| maxCellineNB | Maximum no. cells that can be served by an eNB. Value is 256. |

Fig. 16B 9.1.2.14 RESOURCE STATUS UPDATE
This message is sent by eNB$_2$ to neighbouring eNB$_1$ to report the results of the requested measurements.
Direction: eNB$_2$ → eNB$_1$.

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1..4095,...) | Allocated by eNB$_1$ | YES | reject |
| eNB2 Measurement ID | M | | INTEGER (1..4095,...) | Allocated by eNB$_2$ | YES | reject |
| Cell Measurement Result | | 1 | | | YES | ignore |
| >Cell Measurement Result Item | | 1 .. <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |
| >>RSRP Measurement Report List | O | | 9.2.76 | | YES | ignore |
| >>CSI Report | O | | 9.2.79 | | YES | ignore |
| >>Slice Instance Status Report List | O | | 9.2.xx | | YES | ignore |
| >>Cell Reporting Indicator | O | | ENUMERATED( stop request,...) | | YES | ignore |

| Range bound | Explanation |
|---|---|
| maxCellineNB | Maximum no. cells that can be served by an eNB. Value is 256. |

Fig. 18

9.2.xx Slice Instance Status Report List
This IE provides Slice Instance Status reports of each Slice Instance provided by the receiving eNB.

| IE/Group Name | Presence | Range | IE type and reference | Semantics description |
|---|---|---|---|---|
| Slice Instance Status List | | 1 .. <maxSliceInstanceinCell> | | |
| >Slice Instance Id | M | | OCTET STRING(2) | |
| >Status | M | | ENUMERATED(Normal, Limited, ...) | |

| Range bound | Explanation |
|---|---|
| maxSliceInstanceinCell | Maximum no. Slice Instance that can be served by a cell. Value is xxx. |

Fig. 19

9.2.xx Slice Instance Status Report List
This IE provides Slice Instance Status reports of each Slice Instance provided by the receiving eNB.

| IE/Group Name | Presence | Range | IE type and reference | Semantics description |
|---|---|---|---|---|
| Slice Instance Status Report Item | | 1 .. <maxCellineNB> | | |
| >Slice Instance Status List | | 1 .. <maxSliceInstanceinCell> | | |
| >>Slice Instance Id | M | | OCTET STRING(2) | |
| >>Status | M | | ENUMERATED(Normal, Limited, ...) | |

| Range bound | Explanation |
|---|---|
| maxCellineNB | Maximum no. cells that can be served by an eNB. Value is 256. |
| maxSliceInstanceinCell | Maximum no. Slice Instance that can be served by a cell. Value is xxx. |

Fig. 20

FIRST BASE STATION, SECOND BASE STATION, TERMINAL APPARATUS, METHOD, PROGRAM, AND RECORDING MEDIUM

CROSS REFERENCE TO RELATED APPLICATIONS

This application is a National Stage of International Application No. PCT/JP2018/010254 filed Mar. 15, 2018, claiming priority based on Japanese Patent Application No. 2017-078695 filed Apr. 12, 2017, the contents of which are incorporated herein by reference.

BACKGROUND

Technical Field

The present invention relates to a first base station, a second base station, a terminal apparatus, a method, a program, and a recording medium.

Background Art

For example, the Next Generation System proposed in 3GPP TR23.799 v14.0.0 is a fifth-generation mobile communication system, which is abbreviated to 5G.

In 5G, it is considered to generate a virtualized network function on an inexpensive general-purpose server instead of using dedicated hardware for a core network (CN) and a radio access network (RAN), to provide network resources depending on time, place, and the like when needed. In 5G, it is also considered to introduce beamforming in which a base station allocates a necessary radio band to a terminal apparatus only for a required time.

In above-described 5G, a terminal apparatus is assumed to be connected to a certain base station through handover, cell reselection, or the like to thereby use the above-described virtualized network function.

For example, PTL 1 discloses, to determine a handover destination and a cell reselection destination, generating neighbouring cell information, based on an attribute of a target radio base station apparatus and an attribute(s) of a radio base station apparatus(es) located around the target radio base station apparatus.

CITATION LIST

Patent Literature

[PTL 1] WO 2011/148883

SUMMARY

Technical Problem

A base station may perform beamforming suitable for provision of a particular network function, depending on conditions, such as installation location and/or time slot, for example. In view of this, a situation is assumed in which the base station is suitable for provision of the particular network function while not being suitable for provision of other network functions. Such individual network functions and radio resources provided by the base station are set or managed on a slice-by-slice basis.

However, in the technique disclosed in PTL 1 described above and the like, such a method is not considered that a slice that is being used by or available for a terminal apparatus can be used even at a handover destination or a cell reselection destination.

An example object of the present invention is to provide a first base station, a second base station, a terminal apparatus, a method, a program, and a recording medium that make a slice that is being used by or available for a terminal apparatus, available even at a handover destination or a cell reselection destination.

Solution to Problem

A first base station of the present invention includes: an obtaining section configured to obtain information related to usage status of a slice provided by the first base station; and a transmission processing section configured to transmit the information related to the usage status of the slice.

A second base station according to the present invention includes: a reception processing section configured to receive information related to usage status of a slice provided by a first base station; and a storage section configured to store the information related to the usage status of the slice.

A terminal apparatus according to the present invention includes: a reception processing section configured to receive, from a second base station, information related to usage status of a slice provided by a first base station; and a storage section configured to store the information related to the usage status of the slice.

A first method according to the present invention includes: obtaining information related to usage status of a slice provided by a first base station; and transmitting the information related to the usage status of the slice.

A second method according to the present invention includes: receiving information related to usage status of a slice provided by a first base station; and storing the information related to the usage status of the slice, in a storage section.

A third method according to the present invention includes: receiving, from a second base station, information related to usage status of a slice provided by a first base station; and storing the information related to the usage status of the slice, in a storage section.

A first program according to the present invention is a program that causes a processor to: obtain information related to usage status of a slice provided by a first base station; and transmit the information related to the usage status of the slice.

A second program according to the present invention is a program that causes a processor to: receive information related to usage status of a slice provided by a first base station; and store the information related to the usage status of the slice, in a storage section.

A third program according to the present invention is a program that causes a processor to: receive information related to usage status of a slice provided by a first base station, from a second base station; and store the information related to the usage status of the slice, in a storage section.

A first recording medium according to the present invention is a computer-readable non-transitory recording medium having recorded thereon a program that causes a processor to: obtain information related to usage status of a slice provided by a first base station; and transmit the information related to the usage status of the slice.

A second recording medium according to the present invention is a computer-readable non-transitory recording medium having recorded thereon a program that causes a processor to: receive information related to usage status of a slice provided by a first base station; and store the information related to the usage status of the slice, in a storage section.

A third recording medium according to the present invention is a computer-readable non-transitory recording medium having recorded thereon a program that causes a processor to: receive, from a second base station, information related to usage status of a slice provided by a first base station; and store the information related to the usage status of the slice, in a storage section.

Advantageous Effects of Invention

According to the present invention, a slice that is being used by or available for a terminal apparatus is available even at a handover destination or a cell reselection destination. Note that, according to the present invention, instead of or together with the above effects, other effects may be exerted.

BRIEF DESCRIPTION OF THE DRAWINGS

FIG. 10 is an explanatory diagram for describing STEP 2 according to the first example of the first example embodiment;

FIG. 15A is a table illustrating an example of messages for requesting usage status of a slice instance;

FIG. 15B is a table illustrating examples of the parameters used in an example of the messages for requesting usage status of a slice instance;

FIG. 16A is a table illustrating an example of a message for acceptance in response to a message for requesting usage status of a slice instance;

FIG. 16B is a table illustrating examples of the parameters used in an example of the messages for acceptance in response to a message for requesting usage status of a slice instances

FIG. 18 is a table illustrating an example of messages for reporting usage status of a slice instance;

FIG. 19 is a table illustrating a detailed example of Slice Instance Status Report List illustrated in FIG. 18;

FIG. 20 is a table illustrating a detailed example of Slice Instance Status Report List illustrated in FIG. 18;

DESCRIPTION OF THE EXAMPLE EMBODIMENTS

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Related Art
2. Overview of Example Embodiments of the Present Invention
3. Configuration of System
4. First Example Embodiment
4.1. Configuration of First Base Station
4.2. Configuration of Second Base Station
4.3. Configuration of Terminal Apparatus
4.4. Technical Features
4.5. Examples
5. Second Example Embodiment
5.1. Configuration of First Base Station
5.2. Configuration of Second Base Station
5.3. Configuration of Terminal Apparatus
5.4. Technical Features
6. Other Example Aspects

1. RELATED ART

As a technique related to example embodiments of the present invention, a network virtualization technology will be described.

Figure 1:
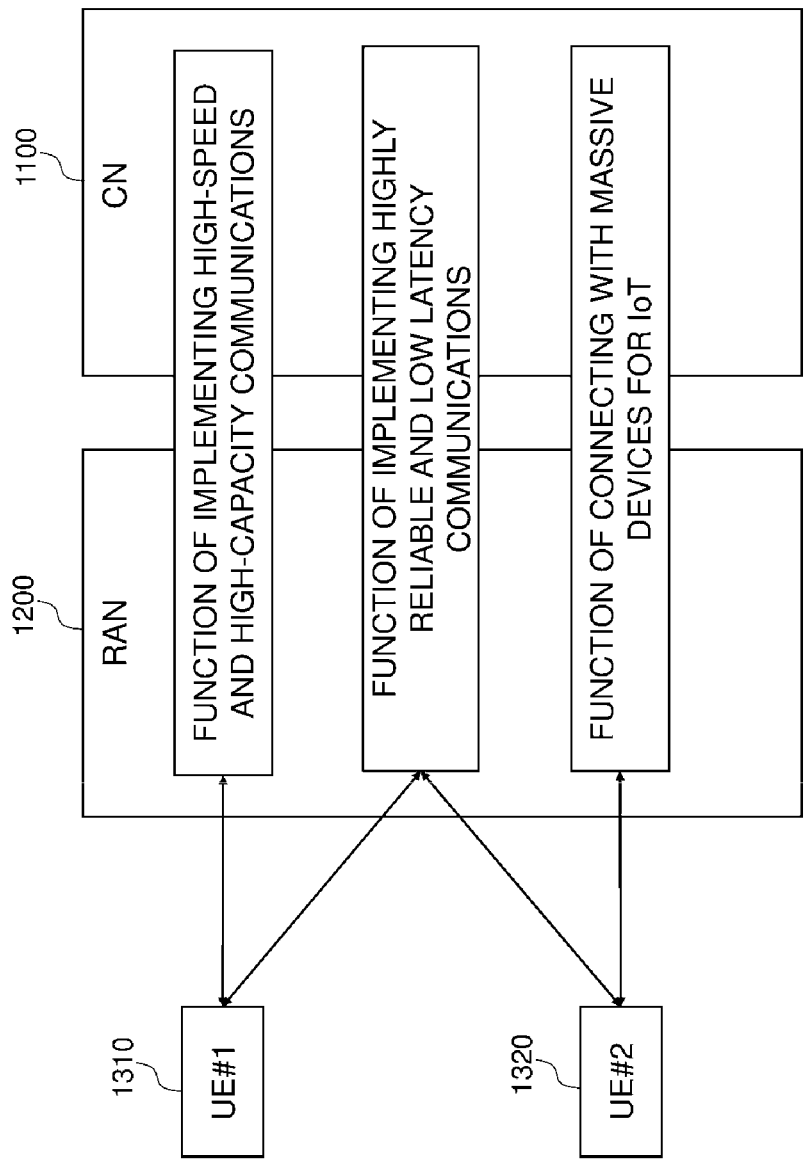
FIG. 1 is a diagram for describing network functions implemented using a network virtualization technology.

FIG. 1 is a diagram for describing network functions implemented using the network virtualization technology.

As illustrated in FIG. 1, in a case of virtualizing a network, a group of functions for different requests, such as a "function of implementing high-speed and high-capacity communications", a "function of implementing highly reliable and low latency communications", and a "function of implementing connections with massive devices for Internet of things (IoT)" is set, each function as a "network slice", in a network of a mobile communication provider from a core network (CN) 1100 to a radio access network (RAN) 1200. The service provided through each of these network slices is provided to each user equipment (UE), which is a terminal apparatus connected to the RAN.

For example, as illustrated in FIG. 1, when a terminal apparatus 1310 (UE #1) and a terminal apparatus 1320 (UE #2) connect to the RAN, the RAN performs a connection request to a function section corresponding to a function requested by each of the UEs.

In the example illustrated in FIG. 1, the terminal apparatus 1310 (UE #1) can use the network slices corresponding to the "function of implementing high-speed and high-capacity communications" and the "function of implementing highly reliable and low latency communications". Meanwhile, the terminal apparatus 1320 (UE #2) can use the network slices corresponding to the "function of implementing highly reliable and low latency communications" and the "function of implementing connections with massive devices for IoT". The RAN determines the function section to connect to each of the UEs according to the request of the UE.

Figure 2:
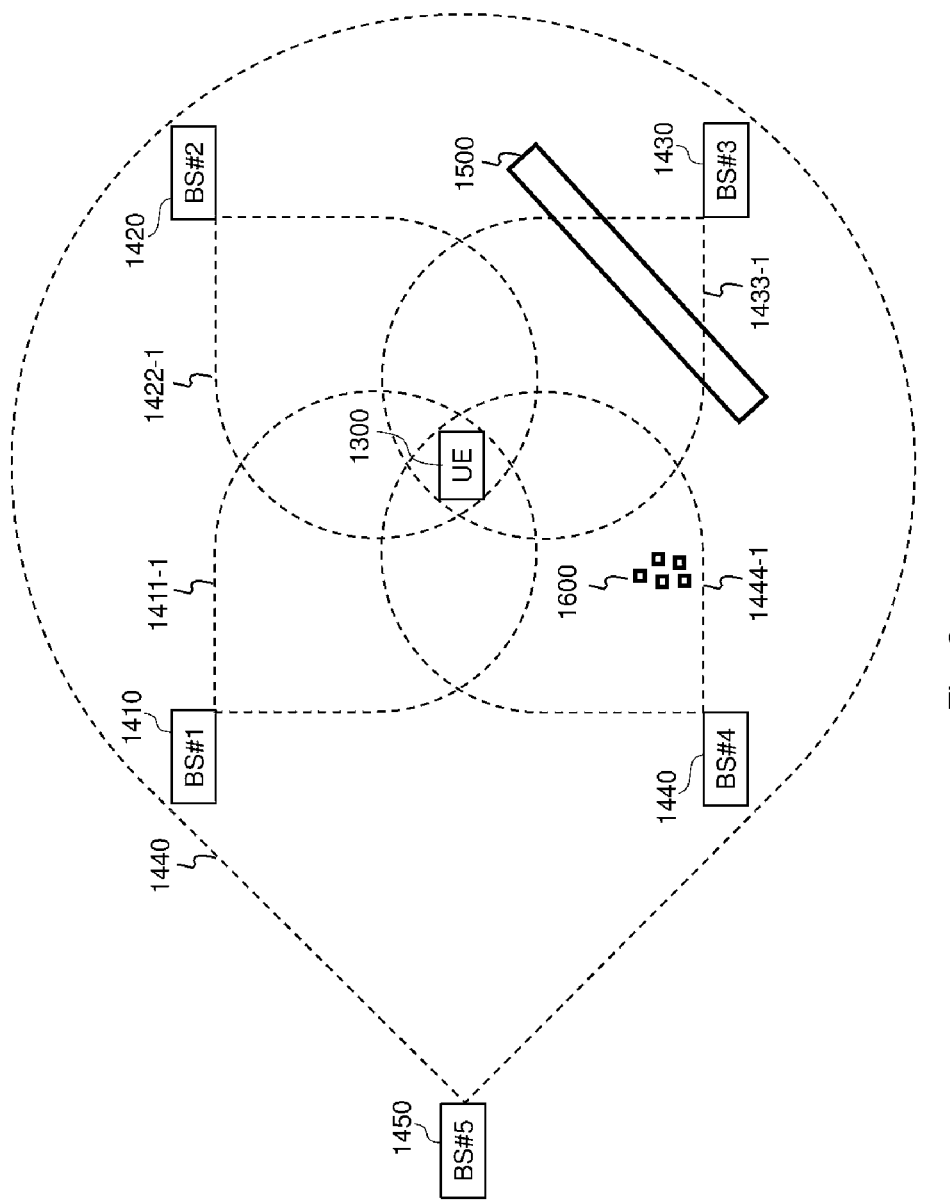
FIG. 2 is a figure illustrating an example of a configuration of a RAN to which the virtualization technology is applied.

FIG. 2 is a figure illustrating an example of a configuration of a RAN to which the virtualization technology is applied.

In the example illustrated in FIG. 2, it is assumed that a base station 1410 (BS #1), a base station 1420 (BS #2), a base station 1430 (BS #3), and a base station 1440 (BS #4) are virtualized base stations and are able to use three network slices as those illustrated in FIG. 1.

The base station 1410 (BS #1), the base station 1420 (BS #2), the base station 1430 (BS #3), and the base station 1440 (BS #4) connect to remote radio heads (RRHs), which are apparatuses configured to transmit radio waves, and independently form beams, to configure a cell 1411-1, a cell 1422-1, a cell 1433-1, and a cell 1444-1, respectively.

A base station 1450 (BS #5) may be virtualized but need not be virtualized and configures a cell 1455-1 including the cell 1411-1, the cell 1422-1, the cell 1433-1, and the cell 1444-1.

For example, the base station 1450 (BS #5) is a master base station in dual connectivity. The base station 1410 (BS #1), the base station 1420 (BS #2), the base station 1430 (BS #3), and the base station 1440 (BS #4) are secondary base stations in dual connectivity.

It is assumed that a UE 1300 is located in the cell 1455-1 served by the base station 1450 (BS #5) and exists at a position of being able to receive radio waves transmitted from the RRHs of the base station 1410 (BS #1), the base station 1420 (BS #2), the base station 1430 (BS #3), and the base station 1440 (BS #4) near the base station 1450 (BS #5).

As illustrated in FIG. 2, it is assumed that an express way 1500 exists in the cell 1433-1, and that a group of IoT devices 1600 exists in the cell 1444-1.

Here, the cell 1433-1 tends to include an overwhelming number of UEs of users of the express way 1500 as those which mainly use the network slice corresponding to the "function of implementing highly reliable and low latency communications". For this reason, the base station 1430 (BS #3) temporarily or permanently controls a beam transmitted from the RRH to be optimal for UEs moving at high speeds, to thereby allocate lots of network resources to the network slice corresponding to the "function of implementing highly reliable and low latency communications". In this way, in the cell 1433-1, the use of the network slice corresponding to the "function of implementing high-speed and high-capacity communications" and the network slice corresponding to the "function of implementing connections with massive devices for IoT" may be limited.

Meanwhile, the cell 1444-1 tends to include an overwhelming number of UEs (group of IoT devices 1600) which mainly use the network slice corresponding to the "function of implementing connections with massive devices for IoT". For this reason, the base station 1440 (BS #4) temporarily or permanently controls a beam transmitted from the RRH to be optimal for the group of IoT devices 1600, to thereby allocate lots of network resources to the network slice corresponding to the "function of implementing connections with massive devices for IoT". In this way, in the cell 1444-1, the use of the network slice corresponding to the "function of implementing high-speed and high-capacity communications" and the network slice corresponding to the "function of implementing highly reliable and low latency communications" may be limited.

2. OVERVIEW OF EXAMPLE EMBODIMENTS OF THE PRESENT INVENTION

First, an overview of example embodiments of the present invention will be described.

(1) Technical Issues

When a UE moves, a radio environment changes, or the load on the base station BS #5 changes, a corresponding base station(s) needs to perform handover of a UE in communication to another cell or to broadcast a cell reselection destination to a UE not in communication, to thereby prevent degrade of user experience.

Here, as illustrated in FIG. 2, when network resources are allocated to part of the network slices with higher priority, only limited resources are available to other network slices. Consequently, there arises a problem that user experience of receiving services from any of the other network slices may be insufficient after handover or after cell reselection.

In the example illustrated in FIG. 2, when a UE is maintaining high-speed and high-capacity communications, the cell 1433-1 and the cell 1444-1 are not to be designated as measurement objects for handover. In other words, the cell 1411-1 and the cell 1422-1 are to be designated.

Even if a UE is not in communication, if the UE does not have capability as an IoT device, capability as a high-speed mobile unit, or the like, the cell 1433-1 and the cell 1444-1 are not to be designated likewise. In other words, the cell 1411-1 and the cell 1422-1 are to be designated.

An example object of the example embodiments of the present invention is to make a slice (e.g., a network function) that is being used by or available for a terminal apparatus, reliably available even at a handover destination or a cell reselection destination.

(2) Technical Features

In the example embodiments of the present invention, for example, a first base station obtains information related to usage status of a slice provided by the first base station and transmits the information related to the usage status of the slice.

Moreover, in the example embodiments of the present invention, for example, a second base station receives information related to usage status of a slice provided by the first base station and stores the information related to the usage status of the slice.

Furthermore, in the example embodiments of the present invention, for example, a terminal apparatus receives, from the second base station, information related to usage status of a slice provided by the first base station and stores the information related to the usage status of the slice.

In this way, for example, a slice (e.g., a network function) that is being used by or available for a terminal apparatus is made available even at a handover destination or a cell reselection destination.

Note that the above-described technical features are concrete examples of the example embodiments of the present invention, and the present example embodiments of the present invention are, of course, not limited to the above-described technical features.

3. CONFIGURATION OF SYSTEM

Figure 3:
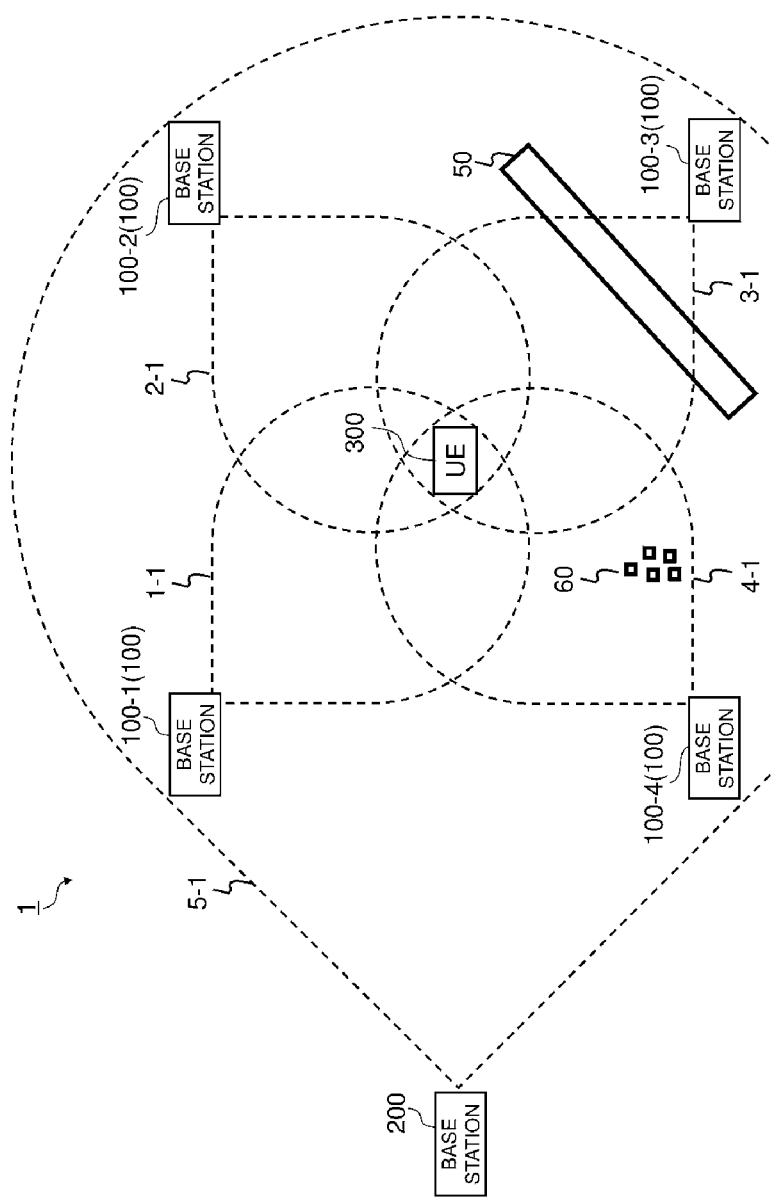
FIG. 3 is an explanatory figure illustrating an example of a schematic configuration of a system 1 according to example embodiments of the present invention.

With reference to FIG. 3, an example of a configuration of a system 1 according to the example embodiments of the present invention will be described. FIG. 3 is an explanatory figure illustrating an example of a schematic configuration of the system 1 according to the example embodiments of the present invention. With reference to FIG. 3, the system 1 includes base stations 100-1, 100-2, 100-3, and 100-4 (referred to as a base station 100 below when collectively described), a base station 200, and a terminal apparatus 300.

For example, the system 1 is a system conforming to Third Generation Partnership Project (3GPP) standards. More specifically, the system 1 may be a system conforming to LTE/LTE-Advanced and/or System Architecture Evolution (SAE). Alternatively, the system 1 may be a system conforming to fifth-generation (5G) standards. The system 1 is, of course, not limited to these examples.

(1) Base Stations 100 and 200

The base stations 100 and 200 are radio access network (RAN) nodes and are configured to perform radio communication with terminal apparatuses (e.g., the terminal apparatus 300) located in respective coverage areas.

The base stations 100 and 200 are each a node configured to perform radio communication with terminal apparatuses, in other words, a Radio Access Network (RAN) node. For example, the base stations 100 and 200 may each be an evolved Node B (eNB) or a generation Node B (gNB) in 5G. The base stations 100 and 200 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base stations 100 and 200 may each be a single unit (or a single node). In this case, the base stations 100 and 200 may each be one of the plurality of units (e.g., either one of the first unit and the second unit) or may each be connected to another unit of the plurality of units (e.g., the other one of the first unit and the second unit).

(2) Terminal Apparatus 300

The terminal apparatus 300 performs radio communication with a base station. For example, the terminal apparatus 300 performs radio communication with each of the base stations 100 and 200 in a case of being located in the coverage area of each of the base stations 100 and 200. For example, the terminal apparatus 300 is a UE.

4. FIRST EXAMPLE EMBODIMENT

Next, a description will be given of a first example embodiment of the present invention.

4.1. CONFIGURATION OF FIRST BASE STATION

Figure 4:
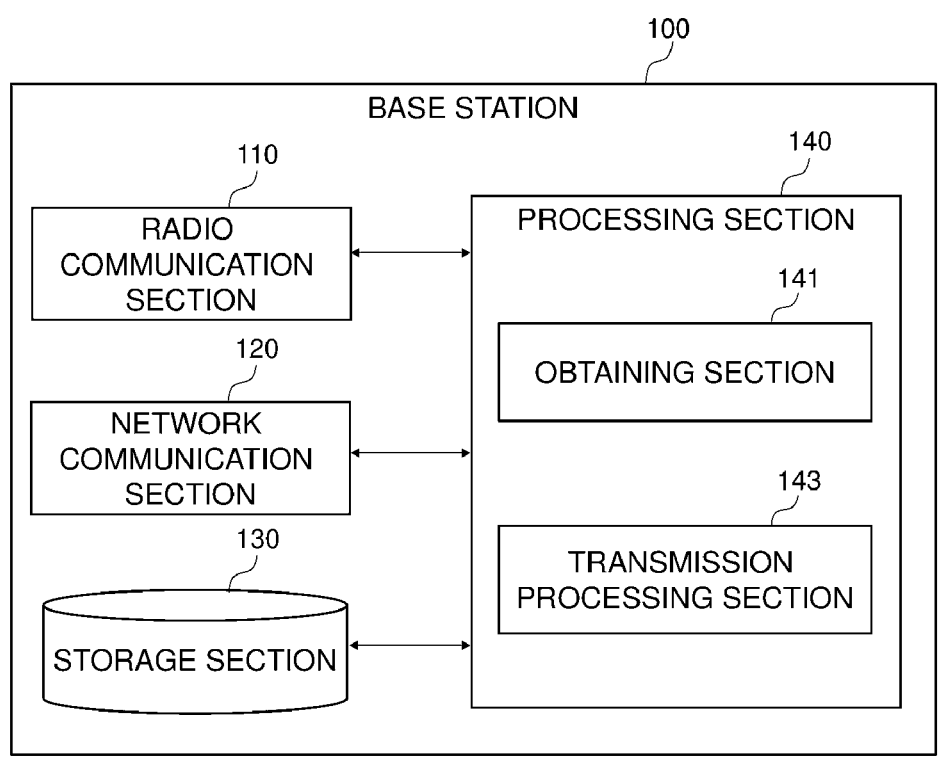
FIG. 4 is a block diagram illustrating an example of a schematic configuration of a base station 100 according to a first example embodiment.

Next, with reference to FIG. 4, a description will be given of an example of a configuration of a first base station (base station 100) according to the first example embodiment. FIG. 4 is a block diagram illustrating an example of a schematic configuration of the base station 100 according to the first example embodiment. With reference to FIG. 4, the base station 100 includes a radio communication section 110, a network communication section 120, a storage section 130, and a processing section 140.

(1) Radio Communication Section 110

The radio communication section 110 wirelessly transmits and/or receives a signal. For example, the radio communication section 110 receives a signal from a terminal apparatus and transmits a signal to the terminal apparatus.

(2) Network Communication Section 120

The network communication section 120 receives a signal from a network and transmits a signal to the network.

(3) Storage Section 130

The storage section 130 temporarily or permanently stores programs (instructions) and parameters for operations of the base station 100 as well as various data. The program includes one or more instructions for operations of the base station 100.

(4) Processing Section 140

The processing section 140 provides various functions of the base station 100. The processing section 140 includes an obtaining section 141 and a transmission processing section 143. Note that the processing section 140 may further include constituent elements other than these constituent elements. In other words, the processing section 140 may also perform operations other than the operations of these constituent elements. Concrete operations of the obtaining section 141 and the transmission processing section 143 will be described later in (5) Implementation Example The radio communication section 110 may be implemented with an antenna, a radio frequency (RF) circuit, and the like, and the antenna may be a directional antenna. The network communication section 120 may be implemented with a network adapter and/or a network interface card, and the like. The storage section 130 may be implemented with a memory (e.g., a nonvolatile memory and/or a volatile memory) and/or a hard disk, and the like. The processing section 140 may be implemented with one or more processors, such as a baseband (BB) processor and/or a different kind of processor. The obtaining section 141 and the transmission processing section 143 may be implemented with the same processor or may be implemented with separate processors. The memory (storage section 130) may be included in the one or more processors or may be provided outside the one or more processors.

The base station 100 may include a memory configured to store a program (instructions) and one or more processors that can execute the program (instructions). The one or more processors may execute the program and thereby perform operations of the processing section 140 (operations of the obtaining section 141 and/or the transmission processing section 143). The program may be a program for causing the processor(s) to perform operations of the processing section 140 (operations of the obtaining section 141 and/or the transmission processing section 143).

Each of the above-described processors may, for example, be a virtual processor implemented with a hypervisor installed in a general-purpose computer or the like. Moreover, the above-described memory or memories may, for example, be a virtual memory implemented with a hypervisor installed in a general-purpose computer or the like.

4.2. CONFIGURATION OF SECOND BASE STATION

Figure 5:
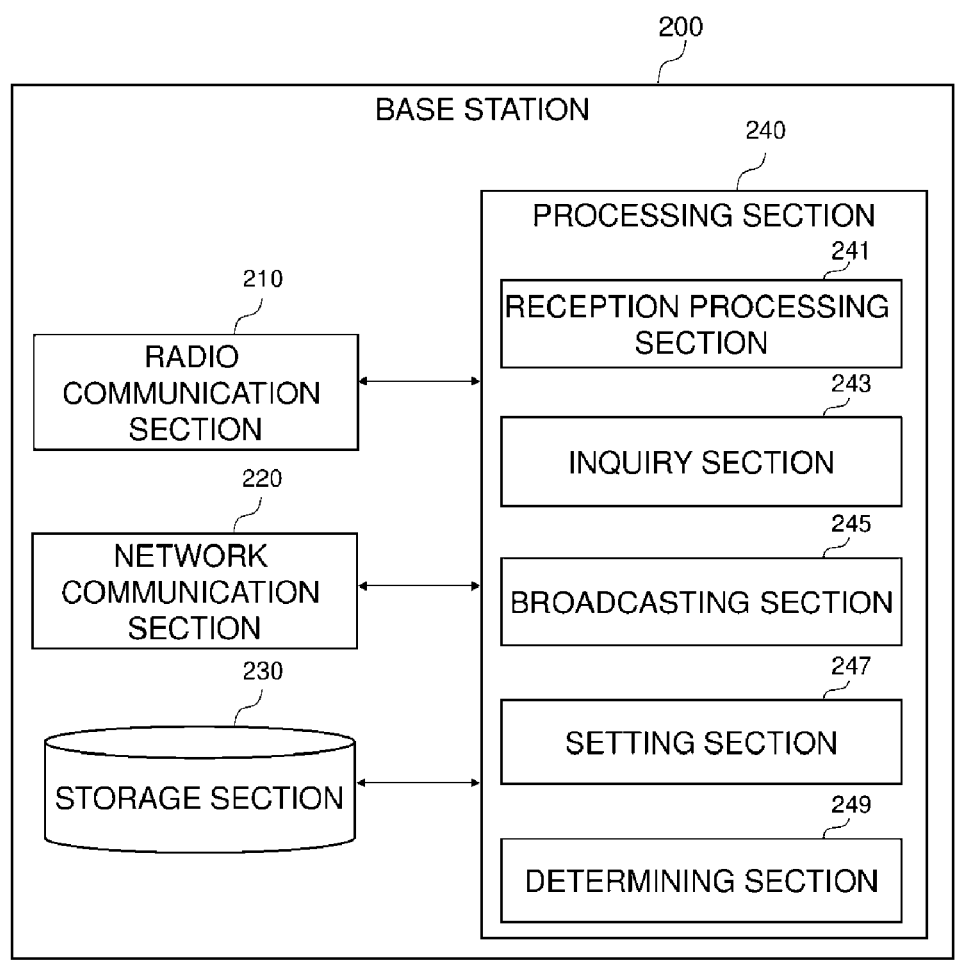
FIG. 5 is a block diagram illustrating an example of a schematic configuration of a base station 200 according to the first example embodiment.

With reference to FIG. 5, a description will be given of an example of a configuration of a second base station (base station 200) according to the first example embodiment. FIG. 5 is a block diagram illustrating an example of a schematic configuration of the base station 200 according to the first example embodiment. With reference to FIG. 5, the base station 200 includes a radio communication section 210, a network communication section 220, a storage section 230, and a processing section 240.

(1) Radio Communication Section 210

The radio communication section 210 wirelessly transmits and/or receives a signal. For example, the radio communication section 210 receives a signal from a terminal apparatus and transmits a signal to the terminal apparatus.

(2) Network Communication Section 220

The network communication section 220 receives a signal from a network and transmits a signal to the network.

(3) Storage Section 230

The storage section 230 temporarily or permanently stores programs (instructions) and parameters for operations of the base station 100 as well as various data. The program includes one or more instructions for operations of the base station 200.

(4) Processing Section 240

The processing section 240 provides various functions of the base station 200. The processing section 240 includes a reception processing section 241, an inquiry section 243, a broadcasting section 245, a setting section 247, and a determining section 249. Note that the processing section 240 may further include constituent elements other than these constituent elements. In other words, the processing section 240 may also perform operations other than the operations of these constituent elements. Concrete operations of the reception processing section 241, the inquiry section 243, the broadcasting section 245, the setting section 247, and the determining section 249 will be described later in detail.

(5) Implementation Example

The radio communication section 210 may be implemented with an antenna, a radio frequency (RF) circuit, and the like, and the antenna may be a directional antenna. The network communication section 220 may be implemented with a network adapter and/or a network interface card, and the like. The storage section 230 may be implemented with a memory (e.g., a nonvolatile memory and/or a volatile memory) and/or a hard disk, and the like. The processing section 240 may be implemented with one or more processors, such as a baseband (BB) processor and/or a different kind of processor. The reception processing section 241, the inquiry section 243, the broadcasting section 245, the setting section 247, and the determining section 249 may be implemented with the same processor or may be implemented with separate processors. The memory (storage section 230) may be included in the one or more processors or may be provided outside the one or more processors.

The base station 200 may include a memory configured to store a program (instructions) and one or more processors that can execute the program (instructions). The one or more processors may execute the program and thereby perform operations of the processing section 240 (operations of the reception processing section 241, the inquiry section 243, the broadcasting section 245, the setting section 247, and/or the determining section 249). The program may be a program for causing the processor(s) to perform operations of the processing section 240 (operations of the reception processing section 241, the inquiry section 243, the broadcasting section 245, the setting section 247, and/or the determining section 249).

Each of the above-described processors may, for example, be a virtual processor implemented with a hypervisor installed in a general-purpose computer or the like. Moreover, the above-described memory or memories may, for example, be a virtual memory implemented with a hypervisor installed in a general-purpose computer or the like.

4.3. CONFIGURATION OF TERMINAL APPARATUS>

Figure 6:
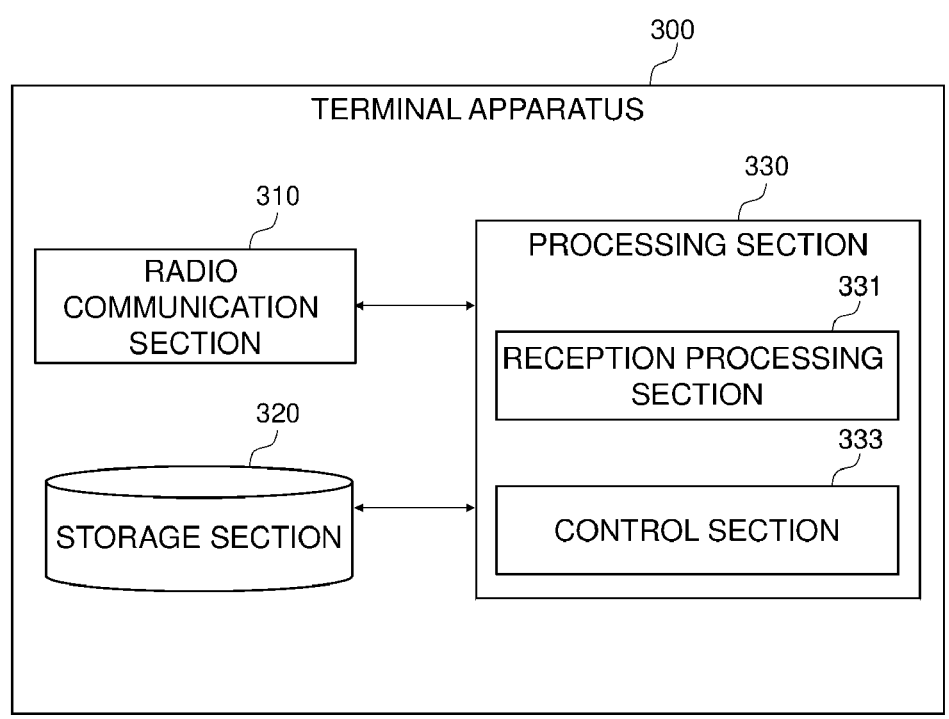
FIG. 6 is a block diagram illustrating an example of a schematic configuration of a terminal apparatus 300 according to the first example embodiment.

Next, with reference to FIG. 6, an example of a configuration of the terminal apparatus 300 according to the first example embodiment will be described. FIG. 6 is a block diagram illustrating an example of a schematic configuration of the terminal apparatus 300 according to the first example embodiment. With reference to FIG. 6, the terminal apparatus 300 includes a radio communication section 310, a storage section 320, and a processing section 330.

(1) Radio Communication Section 310

The radio communication section 310 wirelessly transmits and/or receives a signal. For example, the radio communication section 310 receives a signal from the base stations (e.g., the base stations 100 and 200) and transmits a signal to the base stations (e.g., the base stations 100 and 200).

(2) Storage Section 320

The storage section 320 temporarily or permanently stores programs (instructions) and parameters for operations of the terminal apparatus 300 as well as various data. The program includes one or more instructions for the operations of the terminal apparatus 300.

(3) Processing Section 330

The processing section 330 provides various functions of the terminal apparatus 300. The processing section 330 includes a reception processing section 331 and a control section 333. Note that the processing section 330 may further include constituent elements other than these constituent elements. In other words, the processing section 330 may also perform operations other than the operations of these constituent elements. Concrete operations of the reception processing section 331 and the control section 333 will be described later in detail.

(4) Implementation Example

The radio communication section 310 may be implemented with an antenna, a radio frequency (RF) circuit, and the like, and the antenna may be a directional antenna. The storage section 320 may be implemented with a memory (e.g., a nonvolatile memory and/or a volatile memory) and/or a hard disk, and the like. The processing section 330 may be implemented with one or more processors, such as a baseband (BB) processor and/or a different kind of processor. The reception processing section 331 and the control section 333 may be implemented with the same processor or may be implemented with separate processors. The memory (storage section 320) may be included in the one or more processors or may be provided outside the one or more processors.

The terminal apparatus 300 may include a memory configured to store a program (instructions) and one or more processors that can execute the program (instructions). The one or more processors may execute the program and thereby perform operations of the processing section 330 (operations of the reception processing section 331 and/or the control section 333). The program may be a program for causing the processor(s) to perform operations of the processing section 330 (operations of the reception processing section 331 and/or the control section 333).

4.4. TECHNICAL FEATURES

Next, technical features of the first example embodiment will be described.

The base station 100 (obtaining section 141) obtains information related to usage status of a slice provided by the base station 100. The base station 100 (transmission processing section 143) then transmits the information related to the usage status of the slice.

The base station 200 (reception processing section 241) receives the information related to the usage status of the slice provided by the base station 100. The base station 200 (storage section 230) then stores the information related to the usage status of the slice.

(1) Transmission of Information Related to Usage Status of Slice

Slice

The slice is, for example, a slice of a network function logically generated in the base station 100 and, in other words, includes a network slice. In particular, the network slice includes one or more slice instances according to the kind of function or intended use, for example. In the following, it is assumed, for example, that the base station 100 provides, to a terminal apparatus (terminal apparatus 300), three slice instances in total including a slice instance S1 corresponding to the "function of implementing high-speed and high-capacity communications", a slice instance S2 corresponding to the "function of implementing highly reliable and low latency communications", and a slice instance S3 corresponding to the "function of implementing connections with massive devices for Internet of things (IoT)".

Note that the slice is not limited to the above-described network slices and may include a RAN slice for which radio resources provided by the base station 100 are set for each slice.

Identifier

The information related to the usage status of the network slice includes an identifier of the slice instance. For example, the information related to the usage status of the network slice includes an identifier Sid1 identifying the slice instance S1, an identifier Sid2 identifying the slice instance S2, and an identifier Sid3 identifying the slice instance S3.

Information Indicating Usage Status

The information related to the usage status of the network slice includes information indicating usage status of the slice instance. For example, when the information indicating the usage status of the slice instance indicates "normal", this indicates that the slice instance is available, while, when the information indicates "limited", this indicates that the use of the slice instance is limited.

Transmission Destination

The base station 100 (transmission processing section 143) transmits the information related to the usage status of the network slice to the base station 200. For example, the base station 100 (transmission processing section 143) directly transmits the information related to the usage status of the network slice to the base station 200 via an X2 interface, an Xn interface, an Xx interface, or the like.

The base station 100 (transmission processing section 143) may transmit, to a core network, the information related to the usage status of the network slice. In this case, the information related to the usage status of the network slice transmitted to the core network is transmitted from a node of the core network to the base station 200, for example.

Transmission Timing

The base station 100 (transmission processing section 143) may transmit the information related to the usage status of the network slice when the information related to the usage status of the network slice changes. The base station 100 (transmission processing section 143) may transmit the information related to the usage status of the network slice when the usage status of at least one slice instance among the three slice instances S1 to S3 changes, for example. Note that the base station 100 (transmission processing section 143) may transmit the information related to the usage status of the network slice at periodic timings.

Transmission of Information Related to Neighbouring Base Station

The base station 100 (obtaining section 141) may further obtain information related to usage status of a slice provided by a base station adjacent to the base station 100. The base station 100 (transmission processing section 143) may then further transmit the information related to the usage status of the slice provided by the neighbouring base station.

For example, when the base station 100-1 and the base station 100-2 are adjacent to each other, the base station 100-1 obtains information related to usage status of a slice provided by the base station 100-2 and transmits the information related to the usage status of the slice to the base station 200, for example.

(2) Reception of Information Related to Usage Status of Network Slice

The base station 200 (reception processing section 241) receives the information related to the usage status of the network slice provided by the base station 100, from the base station 100 or a node of the core network, for example.

Neighbour Relation Table

The base station 200 (storage section 230) stores the information related to the usage status of the network slice in Neighbour Relation Table for Automatic Neighbour Relation Function. The Automatic Neighbour Relation Function is a function for constructing a neighbour cell relation for performing mobility control and control of a connection with a neighbouring base station, as described, for example, in 3GPP TS36.300 v14.1.0 section 22.3.2a.

Figure 7:
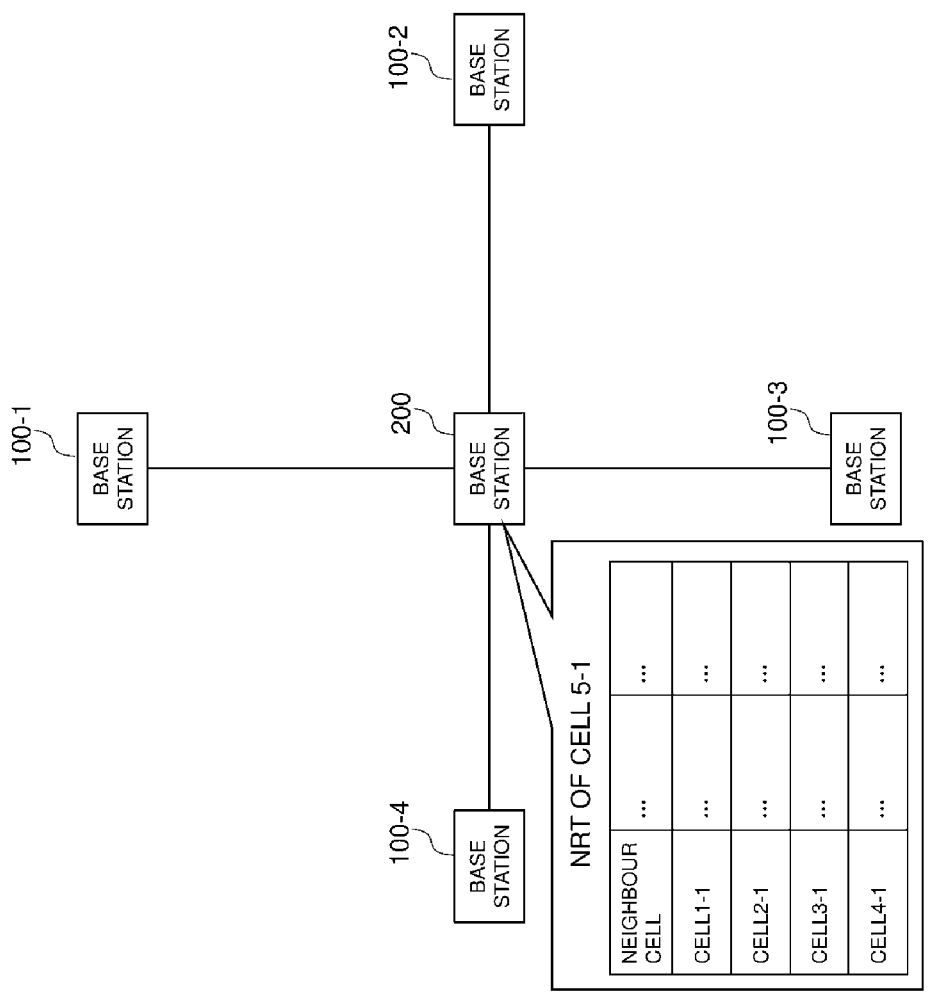
FIG. 7 is a figure for describing registration processing of Neighbour Relation Table (NRT)

For example, as illustrated in FIG. 3 and FIG. 7, the base station 200 (storage section 230) registers cells 1-1, 2-1, 3-1, and 4-1 configured by the respective base stations 100-1, 100-2, 100-3, and 100-4, in the Neighbour Relation Table (NRT) of a cell 5-1 configured by the base station 200. The base station 200 (storage section 230) then stores the information related to the usage status of the network slice in the Neighbour Relation Table of the cell 5-1 in association with respective cell 1-1, 2-1, 3-1, and 4-1.

Inquiry

The base station 200 (inquiry section 243) inquires of the base station 100 the information related to the usage status of the network slice provided by the base station 100. The base station 200 may inquire of the base station by using a message such as RESOURCE STATUS REQUEST defined by 3GPP, for example. Through the inquiry, the base station 200 (reception processing section 241) can receive the information related to the usage status of the network slice provided by the base station 100.

Broadcast

The base station 200 (broadcasting section 245) broadcasts the information related to the usage status of the network slice to terminal apparatuses (e.g., the terminal apparatus 300). For example, the base station 200 broadcasts the information related to the usage status of the network slice stored in the Neighbour Relation Table, to the terminal apparatuses (e.g., the terminal apparatus 300) at periodic timings. Note that the broadcast may be performed at the timing of every update of the Neighbour Relation Table.

Meanwhile, the terminal apparatus 300 (reception processing section 331) receives, from the base station 200, the information related to the usage status of the network slice provided by the base station 100. The terminal apparatus 300 (storage section 320) then stores the information related to the usage status of the network slice. For example, the terminal apparatus 300 (control section 333) performs cell reselection or the like, based on the information related to the usage status of the network slice.

Setting of Measurement Object

Figure 8:
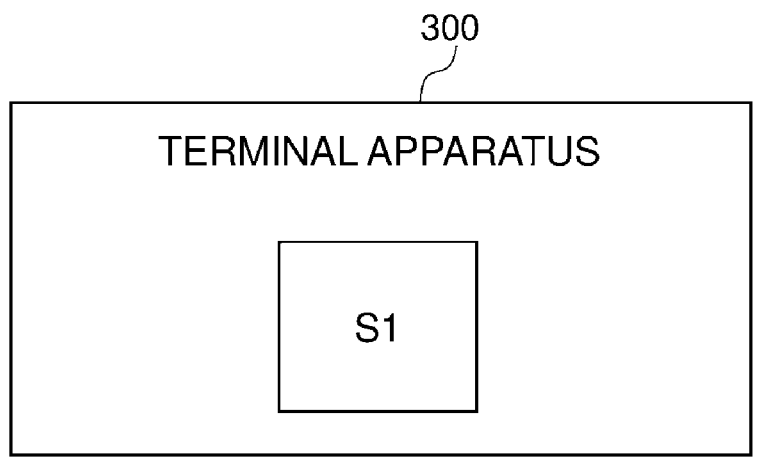
FIG. 8 is a figure for describing an example of a slice instance used by a terminal apparatus.

The base station 200 (setting section 247) sets a target cell to be measured by a terminal apparatus (e.g., the terminal apparatus 300), based on the information related to the usage status of the network slice. For example, when the terminal apparatus 300 is in use of the slice instance S1 as illustrated in FIG. 8, the base station 200 (setting section 247) sets, as the target cell, a cell configured by a base station with the usage status of the slice instance S1 being "normal". The base station 200 (setting section 247) then notifies the terminal apparatus 300 of information indicating the set target cell.

Determination of Handover Destination

The base station 200 (determining section 249) determines a handover destination for a terminal apparatus, based on the information related to the usage status of the network slice. In other words, the base station 200 (determining section 249) performs mobility control for the terminal apparatus, based on the information related to the usage status of the network slice.

For example, when the terminal apparatus 300 is in use of the slice instance S1 as illustrated in FIG. 8, the base station 200 (determining section 249) determines, as a handover destination for the terminal apparatus 300, a cell configured by a base station with the usage status of the slice instance S1 being "normal".

4.5. EXAMPLES (1) First Example

Next, a first example according to the first example embodiment will be described.

In the present example, it is assumed that the base stations 100-1, 100-2, 100-3, and 100-4 are virtualized base stations and are able to use the three slice instances S1, S2, and S3.

The base stations 100-1, 100-2, 100-3, and 100-4 connect to the remote radio heads (RRHs), which are apparatuses configured to transmit radio waves, and independently form beams, to configure the cell 1-1, the cell 2-1, the cell 3-1, and the cell 4-1, respectively.

The base station 200 may be virtualized but need not be virtualized and configures the cell 5-1 including the cell 1-1, the cell 2-1, the cell 3-1, and the cell 4-1.

For example, the base station 200 is a master base station in dual connectivity. Meanwhile, the base station 100 is a secondary base station.

The terminal apparatus 300 is located in the cell 5-1 configured by the base station 200 and exists at a position of being able to receive radio waves transmitted from the RRHs of the base stations 100-1, 100-2, 100-3, and 100-4 near the base station 200.

As illustrated in FIG. 3, it is assumed that the express way 50 exists in the cell 3-1, and that the group of IoT devices 60 exists in the cell 4-1.

Here, the cell 3-1 tends to include an overwhelming number of UEs of users of the express way 50 as those which mainly use the slice instance S2 corresponding to the "function of implementing highly reliable and low latency communications". For this reason, the base station 100-3 temporarily or permanently controls a beam transmitted from the RRH to be optimal for UEs moving at high speeds, to thereby allocate lots of network resources to the slice instance S2 corresponding to the "function of implementing highly reliable and low latency communications". In this way, in the cell 3-1, the use of the slice instance S1 corresponding to the "function of implementing high-speed and high-capacity communications" and the slice instance S3 corresponding to the "function of implementing connections with massive devices for IoT" may be limited.

Meanwhile, the cell 4-1 tends to include an overwhelming number of UEs (group of IoT devices 60) which mainly use the slice instance S3 corresponding to the "function of implementing connections with massive devices for IoT". For this reason, the base station 100-4 temporarily or permanently controls a beam transmitted from the RRH to be optimal for the group of IoT devices, to thereby allocate lots of network resources to the slice instance S3 corresponding to the "function of implementing connections with massive devices for IoT". In this way, in the cell 4-1, the use of the slice instance S1 corresponding to the "function of implementing high-speed and high-capacity communications" and the slice instance S2 corresponding to the "function of implementing highly reliable and low latency communications" may be limited.

In such a situation, in STEP 1, each of the base stations 100-1 to 100-4 transmits the information related to the usage status of the network slice to the base station 200.

Figure 9:
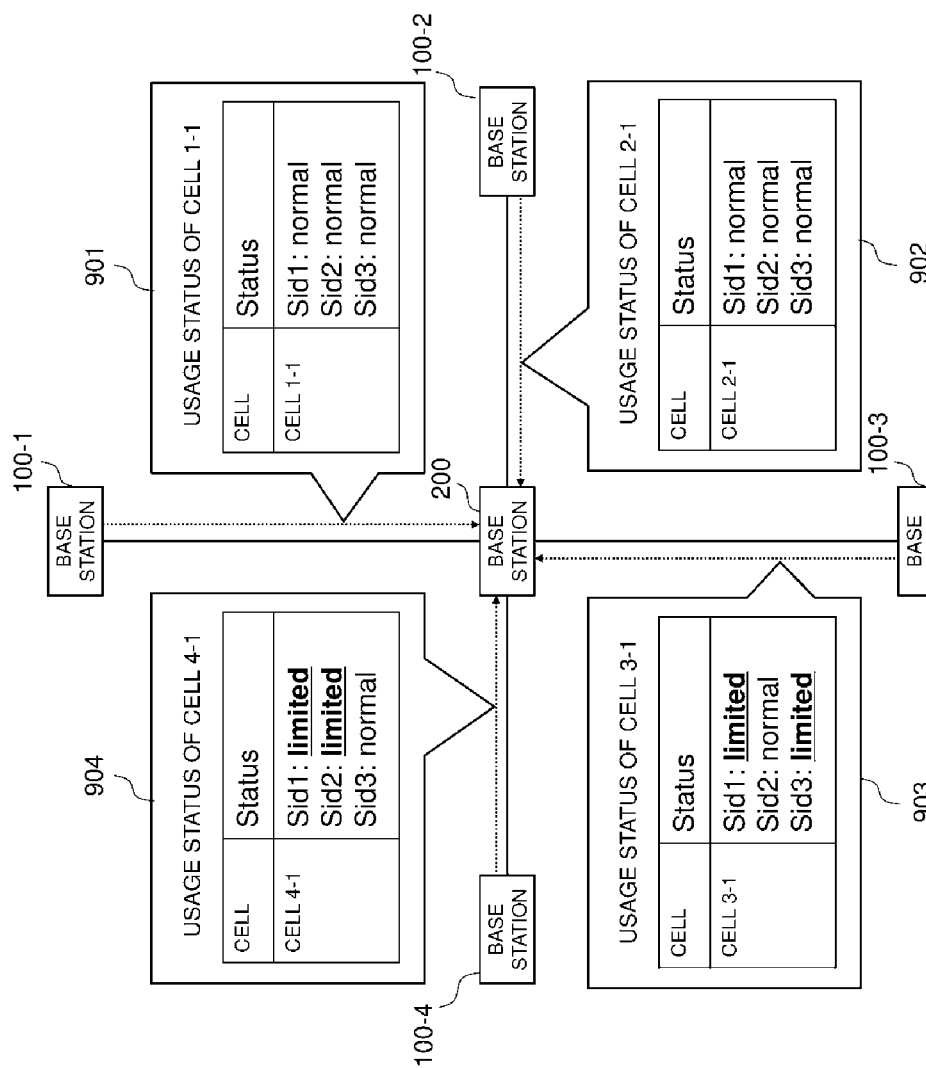
FIG. 9 is an explanatory diagram for describing STEP 1 according to a first example of the first example embodiment.

FIG. 9 is an explanatory diagram for describing STEP 1.

Specifically, the base stations 100-1 and 100-2 respectively transmit, to the base station 200, information 901 and information 902 each indicating "normal" as the usage status of each of the slice instances S1 to S3 identified by the identifiers Sid1 to Sid3.

The base stations 100-3 transmits, to the base station 200, information 903 indicating "limited" as the usage status of each of the slice instance S1 and the slice instance S3 identified by the identifiers Sid1 and Sid3 while indicating "normal" as the usage status of the slice instance S2 identified by the identifier Sid2.

The base station 100-4 transmits, to the base station 200, information 904 indicating "limited" as the usage status of each of the slice instance S1 and the slice instance S2 identified by the identifiers Sid1 and Sid2 while indicating "normal" as the usage status of the slice instance S3 identified by the identifier Sid3.

Subsequently, in STEP 2, the base station 200 updates the information related to the usage status of the network slice stored in Neighbour Relation Table for the cell 5-1.

FIG. 10 is an explanatory diagram for describing STEP 2.

For example, when the usage statuses of all the slice instances S1 to S3 are "normal" in each of the cell 1-1, the cell 2-1, the cell 3-1, and the cell 4-1 in Neighbour Relation Table (NRT) before update as illustrated in FIG. 10, the usage status of each of the slice instance S1 (function of implementing high-speed and high-capacity communications) and the slice instance S3 (function of implementing connections with massive devices for IoT) of the cell 3-1 is updated from "normal" to "limited". Moreover, the usage status of each of the slice instance S1 (function of implementing high-speed and high-capacity communications) and the slice instance S2 (function of implementing highly reliable and low latency communications) of the cell 4-1 is updated from "normal" to "limited".

Subsequently, in STEP 3, the base station 200 performs the following processing, based on the information related to the usage status of the network slice.

Figure 11:
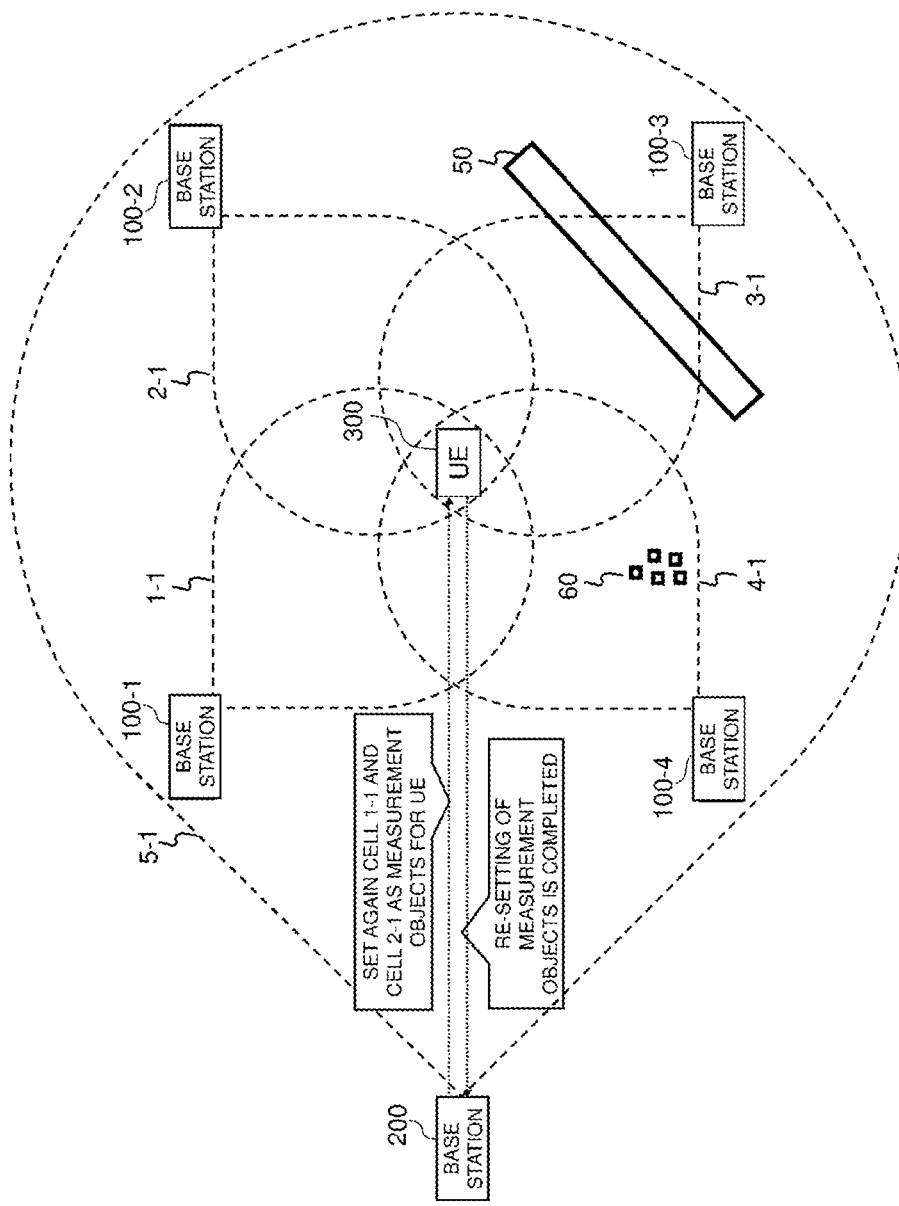
FIG. 11 is an explanatory diagram for describing STEP 3a according to the first example of the first example embodiment.

First, when the base station 200 is connected to the terminal apparatus 300 currently using the slice instance S1, the base station 200 performs STEP 3a. FIG. 11 is an explanatory diagram for describing STEP 3a.

Here, for the cell 3-1 and the cell 4-1, the usage status of the slice instance S1 (function of implementing high-speed and high-capacity communications) is updated to "limited" in STEP 2 described above. Accordingly, the base station 200 (setting section 247) sets the cell 1-1 and the cell 2-1 as measurement objects for handover for the terminal apparatus 300 and transmits the set information to the terminal apparatus 300. After completion of the setting, the terminal apparatus 300 transmits a setting completion notification message to the base station 200.

Subsequently, the base station 200 (determining section 249) determines a cell to be a handover destination in consideration of the usage status of the network slice together with an index, such as signal-to-interference-plus-noise ratio (SINR), at the time of execution of handover.

Figure 12:
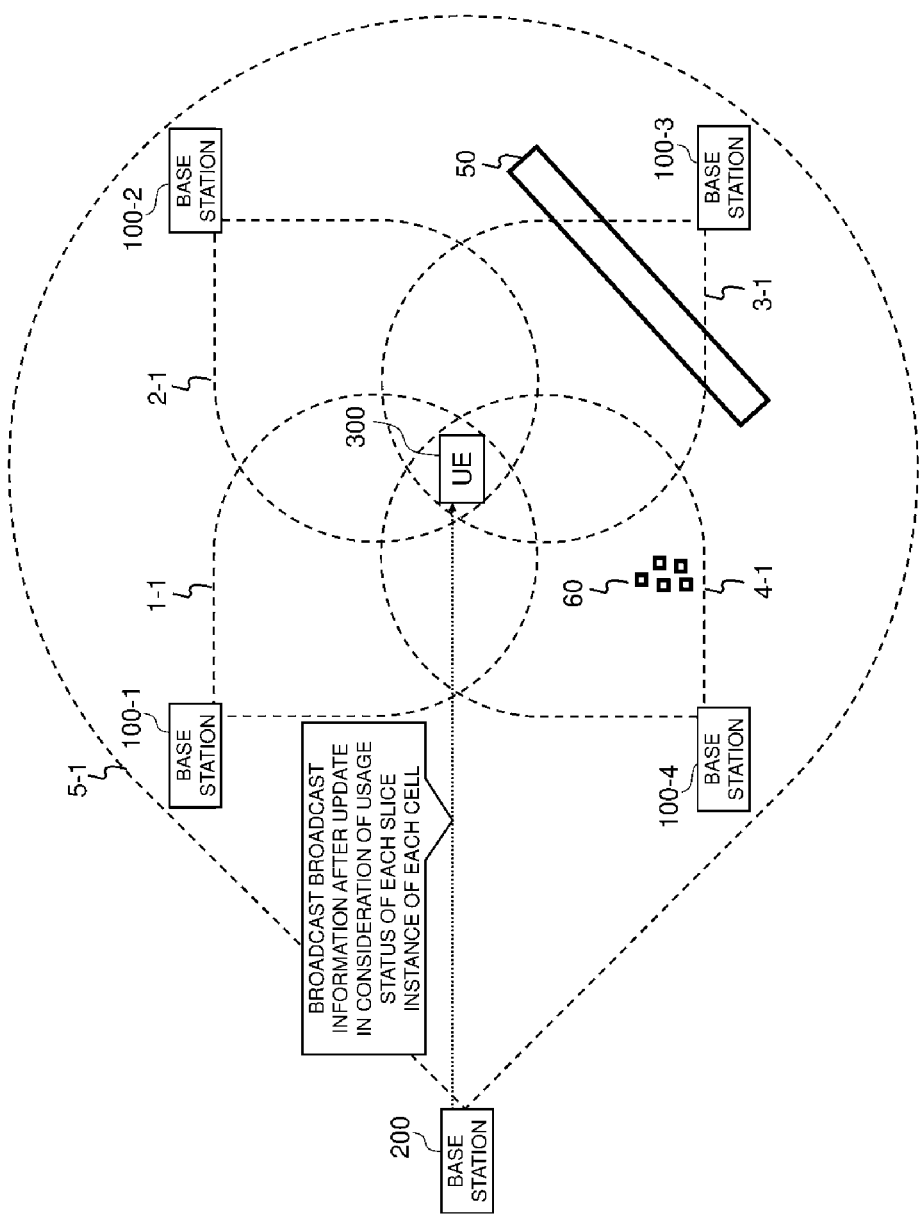
FIG. 12 is an explanatory diagram for describing STEP 3b according to the first example of the first example embodiment.

When the base station 200 is not connected to the terminal apparatus 300 currently using the slice instance S1, on the other hand, the base station 200 performs STEP 3b. FIG. 12 is an explanatory diagram for describing STEP 3b.

The base station 200 (broadcasting section 245) broadcasts, to the terminal apparatus (e.g., the terminal apparatus 300), the information related to the usage status of the network slice stored in the Neighbour Relation Table updated in STEP 2. In other words, the base station 200 (broadcasting section 245) broadcasts, to the terminal apparatus 300, the information related to the usage status of the network slice as neighbouring cell information.

Meanwhile, based on the broadcast information from the base station 200, the terminal apparatus 300 recognizes that the usage status of the slice instance S1 (function of implementing high-speed and high-capacity communications) for the cell 3-1 and the cell 4-1 indicates "limited", to thereby be able to exclude the cell 3-1 and the cell 4-1 from cell reselection destinations, for example.

According to the above-described example, for example, a network slice that is being used by or available for the terminal apparatus is more reliably available even at a handover destination or a cell reselection destination.

Note that various alterations are possible in the present example.

For example, if handover fails after the determination of the cell 1-1 and the cell 2-1 to be measurement objects for the handover in STEP 3a described above, the base station 200 (setting section 247) may add the cell 3-1 or the cell 4-1 as a measurement object. In this way, the probability of success of handover can be increased.

Moreover, in the first example, processing in STEP 1 to STEP 3 described above may be performed not only when the usage status of an existing slice instance changes but also when a slice instance is added or deleted.

The base station 200 may set a measurement object for handover again, determine a handover destination, and update broadcast information, for example, in consideration of both the usage status of the slice instances of the cell (cell 5-1) of the base station 200 and the usage status of the slice instances of the neighbouring cells (cells 1-1 to 4-1).

(2) Second Example

Figure 13:
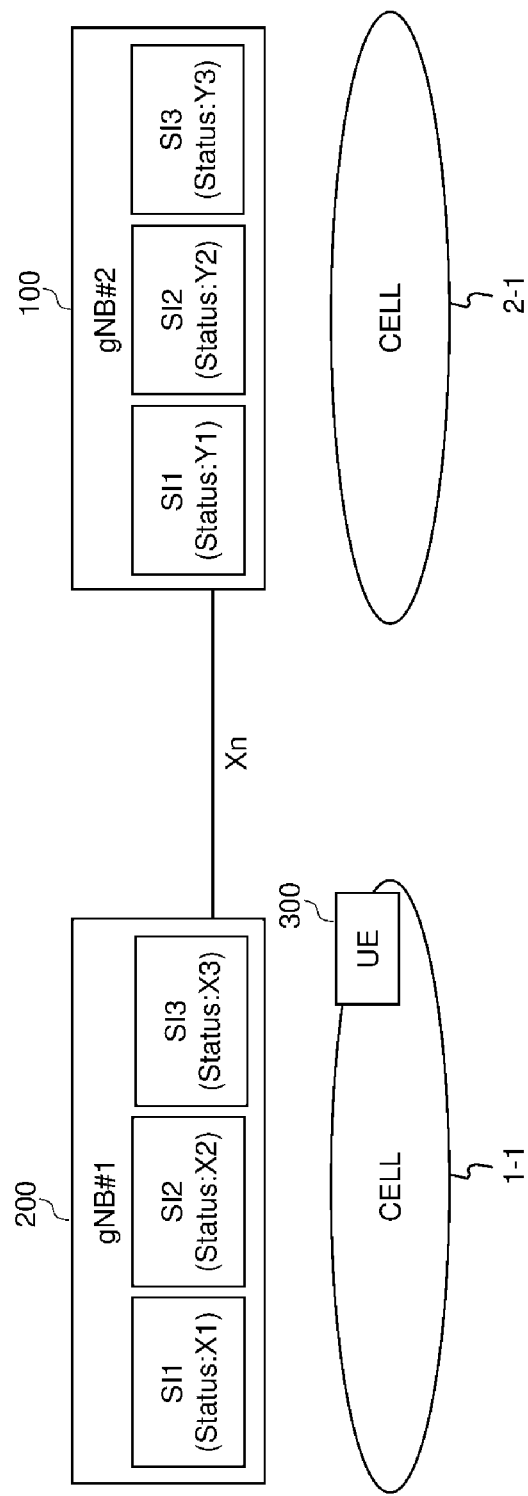
FIG. 13 is a figure illustrating a configuration of a RAN according to a second example of the first example embodiment.

In the present example, it is assumed that each of the base station 100 and the base station 200 configures a gNB in 5G. FIG. 13 is a figure illustrating a configuration of a RAN according to a second example. For example, as illustrated in FIG. 13, the base station 200 (gNB #1) and the base station 100 (gNB #2) configure the cell 1-1 and the cell 2-1 respectively. The base station 200 (gNB #1) and the base station 100 (gNB #2) can establish an Xn interface and exchange information with each other.

As described in 3GPP TR38.913 v14.0.0, a plurality of scenarios including, for example, enhanced mobile broadband (eMBB), ultra-reliable and low latency communication (URLLC), and massive machine type communication (mMTC) are to be taken into consideration in a 5G network.

In view of this, the base station 200 (gNB #1) and the base station 100 (gNB #2) provide a slice instance for an eMBB (slice instance SI1 below), a slice instance for URLLC (slice instance SI2 below), and a slice instance for mMTC (slice instance SI3 below).

In addition, in the present example, the terminal apparatus 300 is located in the cell 1-1 as illustrated in FIG. 13.

Figure 14:
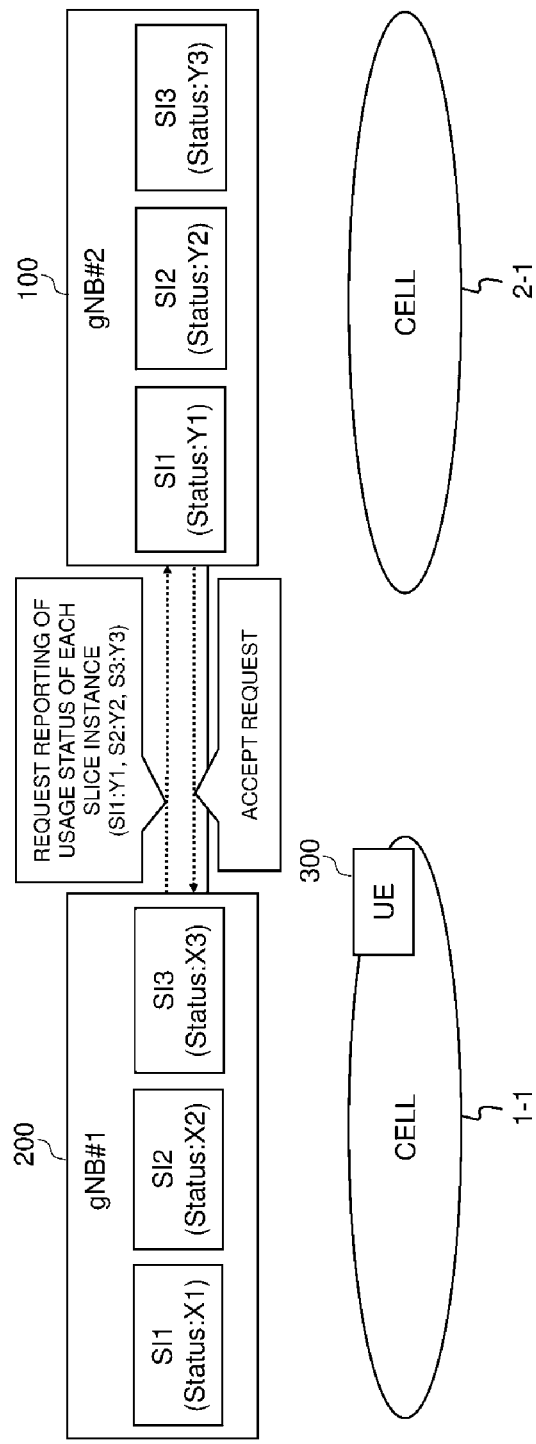
FIG. 14 is an explanatory diagram for describing STEP 1 according to the second example of the first example embodiment.

Under the above-described condition, in the present example, the base station 100 (gNB #2) transmits the information related to the usage status of the network slice to the base station 200 (gNB #1) in STEP 1. FIG. 14 is an explanatory diagram for describing STEP 1.

In STEP 1, first, the base station 200 (gNB #1) requests the base station 100 (gNB #2) to report a usage status of each slice instance with designated periodicity. The base station 100 (gNB #2) accepts the request.

A message for the request is included in X2AP: RESOURCE STATUS REQUEST defined in 3GPP TS36.423 v14.1.0 illustrated in FIG. 15A and FIG. 15B, for example. Specifically, bit data (Eighth Bit=Slice Instance Status Report Periodic) included in Report Characteristics as that indicated in bold type with an underline in FIG. 15A is used as the message for the request.

A message for acceptance of the request is included in X2AP: RESOURCE STATUS RESPONSE defined in 3GPP TS36.423 v14.1.0, as illustrated in FIG. 16A and FIG. 16B, for example. Specifically, bit data (Eighth Bit=Slice Instance Status Report Periodic) included in Measurement Failed Report Characteristics as that indicated in bold type with an underline in FIG. 16A is used as the message for acceptance of the request.

Figure 17:
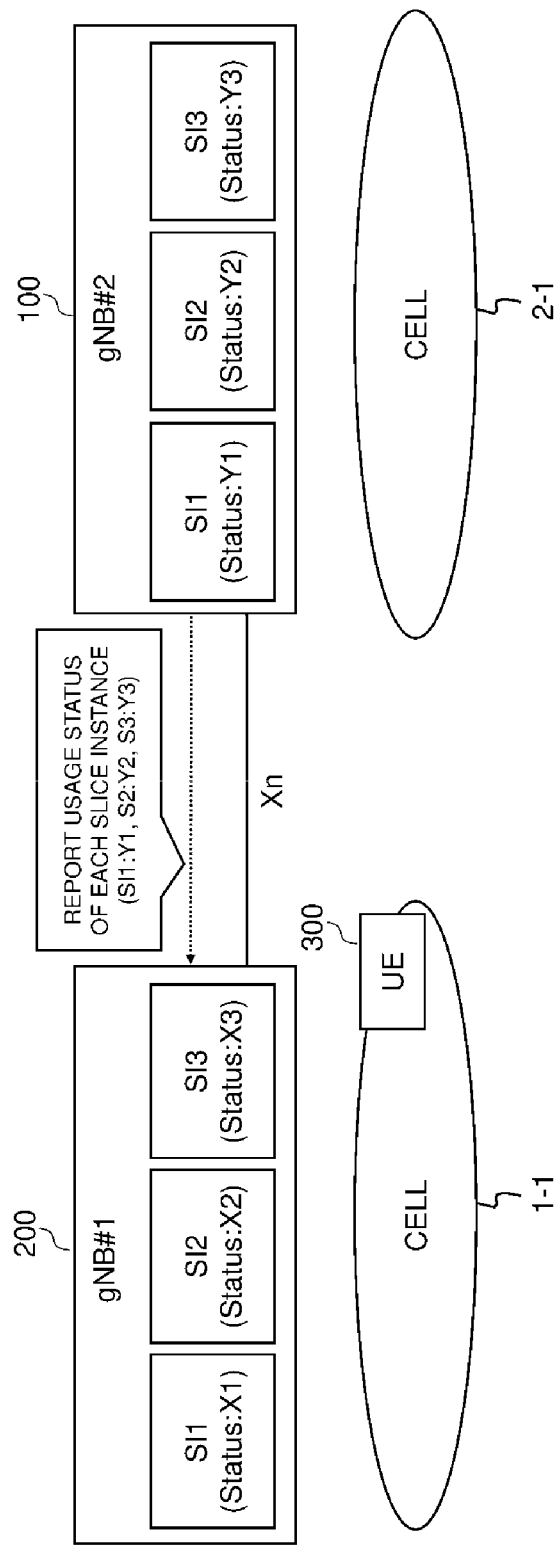
FIG. 17 is an explanatory diagram for describing STEP 2 according to the second example of the first example embodiment.

In STEP 2, the base station 100 (gNB #2) reports a usage status of each slice instance with the periodicity designated in STEP 1 above. FIG. 17 is an explanatory diagram for describing STEP 2.

A message for the report is included in X2AP: RESOURCE STATUS UPDATE defined in 3GPP TS36.423 v14.1.0 as illustrated in FIG. 18, for example. Specifically, Slice Instance Status Report List as that indicated in bold type with an underline in FIG. 18 as an IE of X2AP: RESOURCE STATUS UPDATE is used as the message for the report.

Here, in a case that slice instances available for a terminal apparatus in cells under the control of the same base station are the same, a data table as that illustrated in FIG. 19 can be used as details of the Slice Instance Status Report List illustrated in FIG. 18. Meanwhile, in a case that slice instances available for a terminal apparatus in cells under the control of the same base station are different, a data table as that illustrated in FIG. 20 can be used as details of the Slice Instance Status Report List illustrated in FIG. 18.

In STEP 3, the base station 200 (gNB #1) can perform processing similar to that in STEP 3 in the first example described above, based on the information related to the usage status of the network slice.

As described above, according to the present example, a network slice that is being used by or available for the terminal apparatus is more reliably available even at a handover destination or a cell reselection destination in a 5G network.

Various alterations are possible in the present example.

For example, processing in STEPs 1 to 3 described above may be performed not only when the usage status of an existing slice instance changes but also when a slice instance is added or deleted. Specifically, in the examples in FIG. 19 and FIG. 20, the Slice Instance Status Lists are updated as follows. When a slice instance is added, an identifier (Slice Instance Id) and a usage status (Status) corresponding to the slice instance are added to the Slice Instance Status List. When a slice instance is deleted, an identifier (Slice Instance Id) and a usage status (Status) corresponding to the slice instance are deleted from the Slice Instance Status List.

The base station 100 and the base station 200 may perform a procedure similar to Change of SgNB in 3GPP TS36.300 section 10.1.2.8.4 in an architecture as Option 3/3A/3X proposed in 3GPP TR38.801 v2.0.0 and thereby transmit and/or receive the messages used in STEPs 1 and 2 via an Xx interface established between an LTE eNB and a gNB.

The information related to the usage status of the network slice may be notified to a core network (e.g., NextGen Core or 5G Core Network) via an NG2/NG-c interface or a management apparatus via an interface such as TR-069, for example.

Processing related to transmission and/or reception of the information related to the usage status of the network slice may be performed by using a procedure similar to other procedures, such as an X2 Setup procedure in 3GPP TS36.423 section 8.3.3 and an eNB Configuration Update procedure in section 8.3.4.

The base station 100 may transmit, to the base station 200, not only information related to usage status of a network slice available in the cell of the base station 100 itself but also information related to usage status of a network slice available in a cell adjacent to the cell of the base station 100 itself.

(3) Other Examples

The present example embodiment is not limited to the above-described examples.

For example, the present example embodiment is also applicable to a mobile communication system based on a scheme other than 5G and LTE.

A value indicating usage status of a slice is not limited to "normal" and "limited" and may be other values, such as usage rate. Specifically, the value indicating usage status of a slice may be a radio resource usage rate, a hardware usage rate, or a TNL usage rate of each slice (e.g., each slice identifier or each slice instance).

Network slicing is a function of managing or controlling logical nodes of the core network (e.g., NextGen Core or 5G Core Network) individually (independently) as slices (network slices), and allocation of individual radio resources (RAN slices) corresponding to the network slices may be performed in a radio network (e.g., RAN or gNB).

Hence, the base station (gNB) may set (or allocate) individual radio resources to each of the network slices or may set (or allocate) individual radio resources to each slice group consisting of a plurality of network slices. The usage status of a slice may be information (e.g., a radio resource usage rate, a hardware usage rate, or a TNL usage rate) of each slice group. Moreover, in a case that usage status of a slice is shared by gNBs, a relationship between network slices and RAN slices may be shared together or in advance.

5. SECOND EXAMPLE EMBODIMENT

Next, a description will be given of a second example embodiment of the present invention. The above-described first example embodiment is a concrete example embodiment, whereas the second example embodiment is a more generalized example embodiment.

5.1. Configuration of First Base Station

Figure 21:
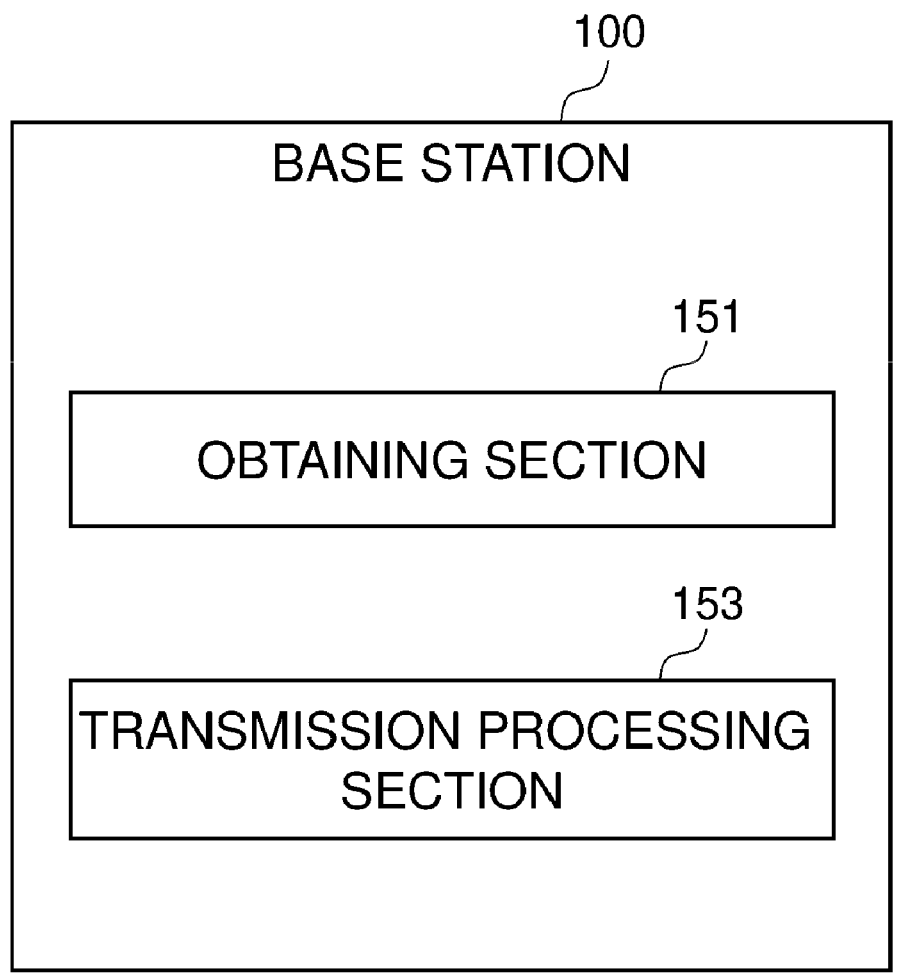
FIG. 21 is a figure illustrating an example of a schematic configuration of a base station 100 according to a second example embodiment.

First, with reference to FIG. 21, a description will be given of an example of a configuration of a first base station (base station 100) according to the second example embodiment. FIG. 21 is a figure illustrating an example of a schematic configuration of the base station 100 according to the second example embodiment. With reference to FIG. 21, the base station 100 includes an obtaining section 151 and a transmission processing section 153. Concrete operations of the obtaining section 151 and the transmission processing section 153 will be described later in detail.

The obtaining section 151 and the transmission processing section 153 may be implemented with the same processor or may be implemented with separate processors. The obtaining section 151 and the transmission processing section 153 may include a memory configured to store a program (instructions) and one or more processors that can execute the program (instructions), and the one or more processors may perform operations of the obtaining section 151 and the transmission processing section 153. The program may be a program for causing the processor(s) to execute the operations of the obtaining section 151 and the transmission processing section 153.

Note that each of the above-described processors may, for example, be a virtual processor implemented with a hypervisor installed in a general-purpose computer or the like. Moreover, the above-described memory or memories may, for example, be a virtual memory implemented with a hypervisor installed in a general-purpose computer or the like.

5.2. Configuration of Second Base Station

Figure 22:
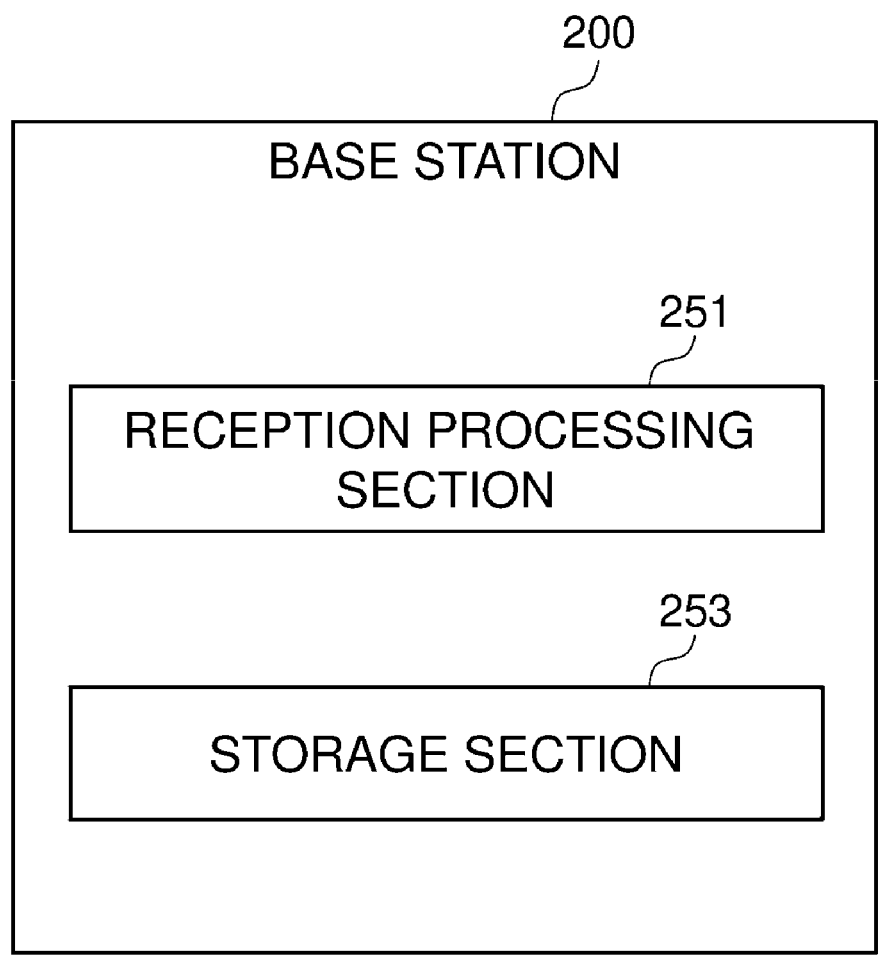
FIG. 22 is a figure illustrating an example of a schematic configuration of a base station 200 according to the second example embodiment.

First, with reference to FIG. 22, a description will be given of an example of a configuration of a second base station (base station 200) according to the second example embodiment. FIG. 22 is a figure illustrating an example of a schematic configuration of the base station 200 according to the second example embodiment. With reference to FIG. 22, the base station 200 includes a reception processing section 251 and a storage section 253. Concrete operations of the reception processing section 251 and the storage section 253 will be described later in detail.

The reception processing section 251 and the storage section 253 may be implemented with the same processor or may be implemented with separate processors. The reception processing section 251 and the storage section 253 may include a memory configured to store a program (instructions) and one or more processors that can execute the program (instructions), and the one or more processors may perform operations of the reception processing section 251 and the storage section 253. The program may be a program for causing the processor(s) to perform the operations of the reception processing section 251 and the storage section 253.

Note that each of the above-described processors may, for example, be a virtual processor implemented with a hypervisor installed in a general-purpose computer or the like. Moreover, the above-described memory or memories may, for example, be a virtual memory implemented with a hypervisor installed in a general-purpose computer or the like.

5.3. Configuration of Terminal Apparatus

Figure 23:
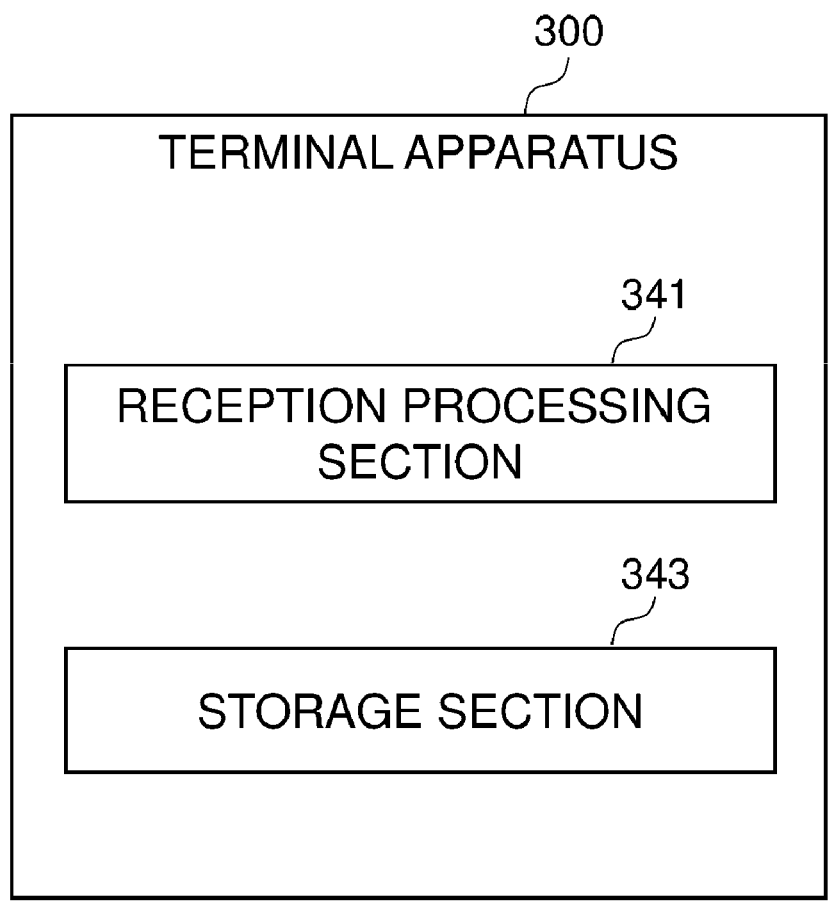
FIG. 23 is a figure illustrating an example of a schematic configuration of a terminal apparatus 300 according to the second example embodiment.

First, with reference to FIG. 23, an example of a configuration of a terminal apparatus 300 according to the second example embodiment will be described. FIG. 23 is a figure illustrating an example of a schematic configuration of the terminal apparatus 300 according to the second example embodiment. With reference to FIG. 23, the terminal apparatus 300 includes a reception processing section 341 and a storage section 343. Concrete operations of the reception processing section 341 and the storage section 343 will be described later in detail.

The reception processing section 341 and the storage section 343 may be implemented with the same processor or may be implemented with separate processors. The reception processing section 341 and the storage section 343 may include a memory configured to store a program (instructions) and one or more processors that can execute the program (instructions), and the one or more processors may perform operations of the reception processing section 341 and the storage section 343. The program may be a program for causing the processor(s) to perform the operations of the reception processing section 341 and the storage section 343.

5.4. Technical Features

Next, technical features of the second example embodiment will be described.

In the second example embodiment, the base station 100 (obtaining section 151) obtains information related to usage status of a slice provided by the base station 100. The base station 100 (transmission processing section 153) then transmits the information related to the usage status of the slice.

For example, the obtaining section 151 may perform operations of the obtaining section 141 according to the above-described first example embodiment. The transmission processing section 153 may perform operations of the transmission processing section 143 according to the above-described first example embodiment.

The base station 200 (reception processing section 251) receives the information related to the usage status of the slice provided by the base station 100. The base station 200 (storage section 253) then stores the information related to the usage status of the slice.

For example, the reception processing section 251 may perform operations of the reception processing section 241 according to the above-described first example embodiment. The storage section 253 may perform operations of the storage section 230 according to the above-described first example embodiment.

Furthermore, the terminal apparatus 300 (reception processing section 341) receives, from the base station 200, information related to usage status of a slice provided by the base station 100. The terminal apparatus 300 (storage section 320) then stores the information related to the usage status of the slice.

For example, the reception processing section 341 may perform operations of the reception processing section 331 according to the above-described first example embodiment. The storage section 343 may perform operations of the storage section 320 according to the above-described first example embodiment.

The second example embodiment has been described above. According to the second example embodiment, for example, a slice that is being used by or available for a terminal apparatus is more reliably available even at a handover destination or a cell reselection destination.

6. OTHER EXAMPLE ASPECTS

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, an apparatus including constituent elements (e.g., the obtaining section and/or the transmission processing section) of the first base station described in the Specification (e.g., one or more apparatuses (or units) among a plurality of apparatuses (or units) constituting the base station or a module for one of the plurality of apparatuses (or units)) may be provided. An apparatus including constituent elements (e.g., the reception processing section, the storage section, the inquiry section, the broadcasting section, the setting section, and/or the determining section) of the second base station described in the Specification (e.g., one or more apparatuses (or units) among a plurality of apparatuses (or units) constituting the base station or a module for one of the plurality of apparatuses (or units)) may be provided. An apparatus including the constituent elements (e.g., the reception processing section, the storage section, and/or the control section) of the terminal apparatus described in the Specification (e.g., a module for the terminal apparatus) may be provided. Moreover, methods including processing of the constituent elements may be provided, and programs for causing a processor to execute processing of the constituent elements may be provided. Moreover, non-transitory computer-readable recording media (non-transitory computer readable media) having recorded thereon the programs may be provided. It is apparent that such apparatuses, modules, methods, programs, and non-transitory computer-readable recording media are also included in the present invention.

The whole or part of the example embodiments disclosed above can be described as, but not limited to, the following supplementary notes.

(Supplementary Note 1)

A first base station comprising:

an obtaining section configured to obtain information related to usage status of a slice provided by the first base station; and a transmission processing section configured to transmit the information related to the usage status of the slice.

(Supplementary Note 2)

The first base station according to Supplementary Note 1, wherein the slice includes one or more slice instances.

(Supplementary Note 3)

The first base station according to Supplementary Note 2, wherein the information related to the usage status of the slice includes an identifier of the slice instance.

(Supplementary Note 4)

The first base station according to Supplementary Note 2 or 3, wherein the information related to the usage status of the slice includes information indicating the usage status of the slice instance.

(Supplementary Note 5)

The first base station according to any one of Supplementary Notes 1 to 4, wherein the transmission processing section is configured to transmit, to a second base station, the information related to the usage status of the slice.

(Supplementary Note 6)

The first base station according to any one of Supplementary Notes 1 to 4, wherein the transmission processing section is configured to transmit, to a core network, the information related to the usage status of the slice.

(Supplementary Note 7)

The first base station according to any one of Supplementary Notes 1 to 6, wherein the transmission processing section is configured to transmit the information related to the usage status of the slice when the information related to the usage status of the slice changes.

(Supplementary Note 8)

The first base station according to any one of Supplementary Notes 1 to 7, wherein the obtaining section is configured to further obtain information related to usage status of a slice provided by a third base station adjacent to the first base station; and the transmission processing section is configured to further transmit the information related to the usage status of the slice provided by the third base station.

(Supplementary Note 9)

A second base station comprising:

a reception processing section configured to receive information related to usage status of a slice provided by a first base station; and a storage section configured to store the information related to the usage status of the slice.

(Supplementary Note 10)

The second base station according to Supplementary Note 9, wherein the storage section is configured to store, in Neighbour Relation Table for Automatic Neighbour Relation Function, the information related to the usage status of the slice.

(Supplementary Note 11)

The second base station according to Supplementary Note 9 or 10, further comprising an inquiry section configured to inquire of the first base station the information related to the usage status of the slice provided by the first base station.

(Supplementary Note 12)

The second base station according to any one of Supplementary Notes 9 to 11, further comprising a broadcasting section configured to broadcast, to a terminal apparatus, the information related to the usage status of the slice.

(Supplementary Note 13)

The second base station according to any one of Supplementary Notes 9 to 12, further comprising a setting section configured to set a target cell to be measured by a terminal apparatus, based on the information related to the usage status of the slice.

(Supplementary Note 14)

The second base station according to any one of Supplementary Notes 9 to 13, further comprising a determining section configured to determine a handover destination for a terminal apparatus, based on the information related to the usage status of the slice.

(Supplementary Note 15)

A terminal apparatus comprising:

a reception processing section configured to receive, from a second base station, information related to usage status of a slice provided by a first base station; and a storage section configured to store the information related to the usage status of the slice.

(Supplementary Note 16)

A method comprising:

obtaining information related to usage status of a slice provided by a first base station; and transmitting the information related to the usage status of the slice.

(Supplementary Note 17)

A method comprising:

receiving information related to usage status of a slice provided by a first base station; and storing the information related to the usage status of the slice, in a storage section.

(Supplementary Note 18)

A method comprising:

receiving, from a second base station, information related to usage status of a slice provided by a first base station; and storing the information related to the usage status of the slice, in a storage section.

(Supplementary Note 19)

A program that causes a processor to:

obtain information related to usage status of a slice provided by a first base station; and transmit the information related to the usage status of the slice.

(Supplementary Note 20)

A program that causes a processor to:

receive information related to usage status of a slice provided by a first base station; and store the information related to the usage status of the slice, in a storage section.

(Supplementary Note 21)

A program that causes a processor to:

receive information related to usage status of a slice provided by a first base station, from a second base station; and store the information related to the usage status of the slice, in a storage section.

(Supplementary Note 22)

A computer-readable non-transitory recording medium having recorded thereon a program that causes a processor to:

obtain information related to usage status of a slice provided by a first base station; and transmit the information related to the usage status of the slice.

(Supplementary Note 23)

A computer-readable non-transitory recording medium having recorded thereon a program that causes a processor to:

receive information related to usage status of a slice provided by a first base station; and store the information related to the usage status of the slice, in a storage section.

(Supplementary Note 24)

A computer-readable non-transitory recording medium having recorded thereon a program that causes a processor to:

receive, from a second base station, information related to usage status of a slice provided by a first base station; and store the information related to the usage status of the slice, in a storage section.

This application claims priority based on JP 2017-078695 filed on Apr. 12, 2017, the entire disclosure of which is incorporated herein.

INDUSTRIAL APPLICABILITY

In a mobile communication system, a slice that is being used by or available for a terminal apparatus can be used even at a handover destination or a cell reselection destination.

REFERENCE SIGNS LIST

1 System
100, 200 Base Station
141, 151 Obtaining Section
143, 153 Transmission Processing Section
130, 230, 253, 320, 343 Storage Section
241, 251, 331, 341 Reception Processing Section
243 Inquiry Section
245 Broadcasting Section
247 Setting Section
249 Determining Section
300 Terminal Apparatus

What is claimed is:

1. A second base station comprising:
a memory storing instructions; and
one or more processors configured to execute the instructions to
receive, from a first base station, information related to usage status of a slice provided by a first base station;
store the information related to the usage status of the slice in a Neighbour Relation Table for Automatic Neighbour Relation Function;
set a target cell to be measured by a terminal apparatus using the slice to a first cell in which the information related to the usage status indicates the slice is available; and
set the target cell to a second cell in which the usage status indicates the slice is limited, when a handover to the first cell fails,
wherein the information related to the usage status of the slice includes information indicating the usage status of a slice instance.

2. The second base station according to claim 1, the one or more processors are configured to execute the instructions to further inquire of the first base station the information related to the usage status of the slice provided by the first base station.

3. The second base station according to claim 1, the one or more processors are configured to execute the instructions to further broadcast, to a terminal apparatus, the information related to the usage status of the slice.

4. The second base station according to claim 1, the one or more processors are configured to execute the instructions to further determine a handover destination for a terminal apparatus, based on the information related to the usage status of the slice.

5. A method performed by a second base station, the method comprising:
receiving, from a first base station, information related to usage status of a slice;
storing the information related to the usage status of the slice in a Neighbour Relation Table for Automatic Neighbour Relation Function;
setting a target cell to be measured by a terminal apparatus using the slice to a first cell in which the information related to the usage status indicates the slice is available; and
setting the target cell to a second cell in which the usage status indicates the slice is limited, when a handover to the first cell fails,
wherein the information related to the usage status of the slice includes information indicating the usage status of a slice instance.

* * * * *